US010844146B2

(12) United States Patent
Berbee et al.

(10) Patent No.: US 10,844,146 B2
(45) Date of Patent: Nov. 24, 2020

(54) ETHYLENE-BASED POLYMERS FORMED BY HIGH PRESSURE FREE RADICAL POLYMERIZATIONS

(71) Applicant: Dow Global Technologies LLC, Midland, MI (US)

(72) Inventors: Otto J. Berbee, Hulst (NL); Nhi T. Y. Dang, Terneuzen (NL); Cornelis J F Hosman, Terneuzen (NL); Joaquin Flores, Aguilar de Campoo (ES)

(73) Assignee: Dow Global Technologies LLC, Midland, MI (US)

( * ) Notice: Subject to any disclaimer, the term of this patent is extended or adjusted under 35 U.S.C. 154(b) by 212 days.

(21) Appl. No.: 16/303,880

(22) PCT Filed: Jun. 22, 2017

(86) PCT No.: PCT/US2017/038786
§ 371 (c)(1),
(2) Date: Nov. 21, 2018

(87) PCT Pub. No.: WO2017/223334
PCT Pub. Date: Dec. 28, 2017

(65) Prior Publication Data
US 2020/0317826 A1    Oct. 8, 2020

(30) Foreign Application Priority Data

Jun. 24, 2016  (EP) .................................... 16382296

(51) Int. Cl.
*C08F 2/38* (2006.01)
*B01J 8/06* (2006.01)
*C08F 10/02* (2006.01)
*C08L 23/06* (2006.01)

(52) U.S. Cl.
CPC ................ *C08F 2/38* (2013.01); *B01J 8/065* (2013.01); *C08F 10/02* (2013.01); *C08L 23/06* (2013.01); *C08L 2205/035* (2013.01); *C08L 2207/066* (2013.01)

(58) Field of Classification Search
CPC .. C08F 2/38; C08F 10/02; B01J 8/065; C08L 23/06; C08L 2207/066; C08L 2205/035
See application file for complete search history.

(56) References Cited

U.S. PATENT DOCUMENTS

| 4,135,044 A | 1/1979 | Beals |
| 7,582,709 B2 | 9/2009 | Goossens et al. |
| 7,745,550 B2 | 6/2010 | Donck et al. |
| 8,445,606 B2 | 5/2013 | Lammens et al. |
| 2013/0184419 A1 | 7/2013 | Berbee et al. |
| 2014/0288257 A1 | 9/2014 | Zschoch et al. |
| 2014/0316094 A1 | 10/2014 | Berbee et al. |
| 2014/0316096 A1 | 10/2014 | Berbee et al. |
| 2015/0274856 A1 | 10/2015 | Berbee et al. |
| 2016/0083568 A1 | 3/2016 | den Doelder et al. |
| 2016/0090476 A1 | 3/2016 | den Doelder et al. |
| 2016/0297904 A1* | 10/2016 | Berbee .................. C08F 210/02 |
| 2016/0297905 A1 | 10/2016 | Berbee et al. |
| 2016/0304638 A1 | 10/2016 | Den Doelder et al. |
| 2017/0107315 A1* | 4/2017 | Osby et al. ......... C08L 23/0869 |
| 2018/0112017 A1* | 4/2018 | Berbee et al. ....... B01J 19/2415 |

FOREIGN PATENT DOCUMENTS

| GB | 1370101 A | 10/1974 |
| JP | 050534422 B2 | 7/2012 |
| WO | 0168723 A2 | 9/2001 |
| WO | 0214379 A1 | 2/2002 |
| WO | 2006094723 A1 | 9/2006 |
| WO | 2012117039 A1 | 9/2012 |
| WO | 2013059042 A2 | 4/2013 |
| WO | 2015100318 A1 | 7/2015 |

OTHER PUBLICATIONS

International Search Report and Written Opinion pertaining to PCT/US2017/038786 dated Sep. 14, 2017.
Extended European Search Report pertaining to European Patent Application No. 16382296.8 dated Oct. 31, 2016.
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C.", Journal of Polymer Science: Part A-1, ; vol. 8, p. 1513-1523 (1970).

(Continued)

*Primary Examiner* — Nathan M Nutter
(74) *Attorney, Agent, or Firm* — Dinsmore & Shohl LLP (57) ABSTRACT

A process to form an ethylene-based polymer, as described herein, in a tubular reactor system comprising at least three ethylene-based feeds, and at least four reaction zones, and where the weight ratio of "the ethylene-based feed to the second zone (EBF2)" to "the ethylene-based feed to the first zone (EBF1)," is from 0.50 to 1.10; and the weight ratio of "the ethylene-based feed to the third zone (EBF3)" to "the ethylene-based feed to the first zone (EBF1)," is from 0.40 to 2.50; in each zone, the polymerization takes place at a start temperature ≥135° C.; and (a) for three or more ethylene based feeds, the peak temperatures in the first and the second zones, are each from 200° C. to 250° C.; and/or (b) for four or more ethylene based feeds, the peak temperatures in the first, the second and the third zones, are each from 200° C. to 250° C.; and the differential in peak temperatures of the first three zones (TP1, TP2, TP3) meets at least one relationship described herein.

11 Claims, 3 Drawing Sheets

(56) References Cited

OTHER PUBLICATIONS

Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.
Sabic, Sabtec CTR LDPE Technology, May 2012, Global Petrochemicals conference, Colegne Germany.

\* cited by examiner

ETHYLENE-BASED POLYMERS FORMED BY HIGH PRESSURE FREE RADICAL POLYMERIZATIONS

REFERENCE TO RELATED APPLICATIONS

This application claims priority to European Patent Application No. 16382296.8, filed Jun. 24, 2016.

BACKGROUND OF INVENTION

Low Density Poly Ethylene (LDPE) is produced in an autoclave and/or tubular reactors at high pressure and temperature. High pressure, free-radical polymerizations are disclosed in the following references: U.S. Pat. Nos. 8,445,606, 4,135,044, 7,582,709, and JP050534422 (Abstract). LDPE products with different properties, for example different levels of long chain branching, different molecular weight distributions, and different densities, can be produced by applying different reactor configurations, such as multiple ethylene-based feed flow injections, and multiple reaction zones. Extrusion coating resins typically require high levels of long chain branching and broad molecular weight distribution (MWD), and such resins are typically polymerized using high peak or control temperatures. On the other hand, narrow MWD resins (having low level of long chain branching), required for film applications, are typically polymerized at lower temperatures. Operating at high or low peak temperatures will strongly affect the ethylene conversion level and the polymer output of tubular LDPE plants. Typically, broad MWD resins are polymerized at lower costs, while narrow MWD resins are polymerized at higher costs. There is a need for new polymerization processes that can be used to prepare ethylene-based polymers that have high LCB levels, yet a narrow MWD. There is a further need for such processes that result in high ethylene conversion levels. These needs have been met by the following invention.

SUMMARY OF THE INVENTION

The invention provides a process to form an ethylene-based polymer, in the presence of at least one free-radical, said process comprises at least the following:

polymerizing a mixture comprising ethylene, in a tubular reactor system comprising at least three ethylene-based feeds, and a reactor configuration comprising at least four reaction zones, and wherein the weight ratio of "the ethylene-based feed to the second reaction zone (EBF2)" to "the ethylene-based feed to the first reaction zone (EBF1)," EBF2/EBF1, is from 0.50 to 1.10; and wherein the weight ratio of "the ethylene-based feed to the third reaction zone (EBF3)" to "the ethylene-based feed to the first reaction zone (EBF1)," EBF3/EBF1, is from 0.40 to 2.50; and wherein in each reaction zone, the polymerization takes place at a start temperature greater, or equal to, 135° C.; and wherein at least one of the following is met:

(a) for three or more ethylene based feed streams, the peak polymerization temperatures in the first and the second reaction zones, are each, independently, from 200° C. to 250° C.; or (b) for four or more ethylene based feed streams, the peak polymerization temperatures in the first, the second and the third reaction zones, are each, independently, from 200° C. to 250° C.;

and wherein the temperature differential between the peak temperatures of the first three reaction zones meets at least one the following relationships:

i) TP1>TP2, and 10° C.≤Δ(TP1−TP2)≤30° C.; and/or
ii) TP1>TP3, and 10° C.≤Δ(TP1−TP3)≤30° C.; and/or
iii) TP1≥TP2, and TP1>TP3, and 0° C.≤Δ(TP1−TP2)≤30° C., and 10° C.≤Δ(TP1−TP3)≤30° C.; and/or
iv) TP1>TP2, and TP1≥TP3, and 10° C.≤Δ(TP1−TP2) ≤30° C., and 0° C.≤Δ(TP1−TP3)≤30° C.; wherein TP1 is the peak temperature of the first reaction zone (TP1), TP2 is the peak temperature of the second reaction zone, and TP3 is the peak temperature of the third reaction zone, and wherein the ethylene based feed stream to the first reaction zone is from 20 wt % to 50 wt % of the total ethylene based feed stream(s) fed to the reactor system.

DETAILED DESCRIPTION

New polymerization processes have been discovered that provide ethylene-based polymers that have a significant level of LCBf and narrower MWD, at a constant ethylene conversion level. It has also been discovered that make-up ethylene and/or make-up CTA distributions can be implemented over the reactor feed stream(s) to further enhance product and process capabilities of above inventive operation.

As discussed above, the invention provides a process to form an ethylene-based polymer, in the presence of at least one free-radical initiator, said process described above. An inventive process may comprise a combination of two or more embodiments described herein.

In one embodiment, the weight ratio of the ethylene-based feed of the second reaction zone (EBF2) to the ethylene-based feed to the first reaction zone (EBF1), EBF2/EBF1, is from 0.50 to 1.05, or 0.50 to 1.00, or from 0.60 to 1.10, or from 0.60 to 1.05, or from 0.60 to 1.00. In one embodiment, the weight ratio of the ethylene-based feed of the second reaction zone (EBF2) to the ethylene-based feed to the first reaction zone (EBF1), EBF2/EBF1, is from 0.70 to 1.10, or from 0.70 to 1.05, or 0.0 to 1.00, or from 0.80 to 1.10, or from 0.80 to 1.05, or from 0.80 to 1.00.

In one embodiment, the weight ratio of the ethylene-based feed of the third reaction zone to the ethylene-based feed to the first reaction zone, EBF3/EBF1, is from 0.40 to 2.40, or 0.40 to 2.30, or from 0.40 to 2.20 or from 0.40 to 2.10. In one embodiment, the weight ratio of the ethylene-based feed of the third reaction zone to the ethylene-based feed to the first reaction zone, EBF3/EBF1, is from 0.50 to 2.50, or from 0.50 to 2.40, or 0.50 to 2.30, or from 0.50 to 2.20 or from 0.50 to 2.10. In one embodiment, the weight ratio of the ethylene-based feed of the third reaction zone to the ethylene-based feed to the first reaction zone, EBF3/EBF1, is from 0.60 to 2.50, or from 0.60 to 2.40, or 0.60 to 2.30, or from 0.60 to 2.20 or from 0.60 to 2.10. In one embodiment, the weight ratio of the ethylene-based feed of the third reaction zone to the ethylene-based feed to the first reaction zone, EBF3/EBF1, is from 0.70 to 2.50, or from 0.70 to 2.40, or 0.70 to 2.30, or from 0.70 to 2.20 or from 0.70 to 2.10.

In one embodiment, wherein in each reaction zone, the polymerization takes place at an start temperature greater, or equal to, 135° C.; and wherein the following is met: (a) for three or more ethylene based feed streams, the peak polymerization temperatures in the first and the second reaction zones, are each, independently, from 200° C. to 250° C.

In one embodiment, the tubular reactor system comprises at least four ethylene-based feeds, and wherein in each reaction zone, the polymerization takes place at an start temperature greater, or equal to, 135° C.; and wherein the following is met: (b) for four or more ethylene based feed streams, the peak polymerization temperatures in the first, the second and the third reaction zones, are each, independently, from 200° C. to 250° C.

In one embodiment, in each reaction zone, polymerization takes place at a minimum temperature≥130° C., or ≥140° C., or ≥145° C., or ≥150° C., or ≥155° C., or ≥160° C.

In one embodiment, when operating with three ethylene feeds, the temperature differential between the peak temperatures of the first reaction zone (TP1) and the second reaction zone (TP2) meets the following relationship: 5° C.≤Δ(TP1−TP2)≤35° C. In one embodiment, when operating with four ethylene feed stream, the temperature differential between the peak temperatures of the first reaction zone (TP1) and the second reaction zone (TP2) meets the following relationship: 5° C.≤Δ(TP1−TP2)≤35° C., and the temperature differential between the peak temperatures of the first reaction zone (TP1) and the third reaction zone (TP3) meets the following relationship: 10° C.≤Δ(TP1−TP3) ≤30° C.

In one embodiment, the reactor configuration comprises at least three ethylene-based feed streams. In one embodiment, the reactor configuration comprises only three ethylene-based feed streams. In one embodiment, the reactor configuration comprises only four ethylene-based feed streams. In one embodiment, the reactor configuration comprises at least four reaction zones. In one embodiment, the reactor configuration comprises only four reaction zones. In one embodiment, the reactor configuration comprises only five reaction zones. In one embodiment, the reactor configuration comprises only six reaction zones.

In one embodiment, the combined amount of monomers and CTA(s) fed to the first reaction zone is from 20 to 60 mole %, or from 20 to 50 mole %, or from 20 to 40%, or from 30 to 40%, of the combined amount of monomers and CTA(s) fed to the polymerization.

In one embodiment, the combined amount of monomers and CTA(s) fed to the third reaction zone is equal to, or larger than the combined amount of monomers and CTA(s) fed to the second reaction zone; and wherein the combined amount of monomers and CTA(s) fed to the second reaction zone is equal to, or larger than the combined amount of monomers and CTA(s) fed to the first reaction zone. In one embodiment, the combined amount of monomers and CTA(s) fed to the fourth reaction zone is equal to, or larger than the combined amount of monomers and CTA(s) fed to the third reaction zone; and wherein the combined amount of monomers and CTA(s) fed to the third reaction zone is equal to, or larger than the combined amount of monomers and CTA(s) fed to the second reaction zone; and wherein the combined amount of monomers and CTA(s) fed to the second reaction zone is equal to, or larger than the combined amount of monomers and CTA(s) fed to the first reaction zone.

In one embodiment, the ethylene conversion is ≥26%, or ≥27%, or ≥28%, or ≥29%, or ≥30% or ≥31%.

The ethylene feed to the first reaction zone is typically preheated to a temperature from 130 to 180° C., while the remaining ethylene, sent as a side feed to the reactor, is fed at the Hyper discharge temperature, or cooled prior to feeding to the reactor. Lower start and/or re-initiation temperature will increase the molecular weight of the local polymer formed. Furthermore, the low start and/or re-initiation temperature will move the reaction mixture closer to the phase separation or cloud point boundary. Especially feeding/mixing of cold ethylene can be critical. Heat transfer is improved and fouling is reduced by decreasing the maximum molecular weight of local polymer formed and moving the process conditions father away from the phase separation boundary. This can be achieved by selecting a minimum value for the start or polymerization temperature conditions within a reaction zone.

In one embodiment, the lowest temperature in a reaction zone is ≥130° C., or ≥140° C., or ≥145° C., or ≥150° C., or ≥155° C., or ≥160° C. In one embodiment, the temperature of the ethylene based feeds fed to the side of the reactor, are at the same temperature as the Hyper discharge temperature. In one embodiment, the temperatures of the ethylene based feeds fed to the side of the reactor, are each, independently, ≤80° C., or ≤60° C., or ≤40° C., or ≤20° C.

In one embodiment, the tubular reactor system comprises four ethylene-based feeds and a hyper compressor, and wherein the average feed temperature of the sum of the second, third and/or fourth ethylene based feed streams is less than the average discharge temperature of the hyper compressor, determined by taking the average temperature of the sum of the discharge streams from the hyper compressor. In one embodiment, the differential between the average discharge temperature of the hyper compressor and the average feed temperature of the sum of the second, third and/or fourth ethylene based feed streams is ≥10° C., or ≥20° C., or ≥30° C., or ≥40° C., or ≥50° C., or ≥60° C., or ≥70° C.; and ≤100° C., or ≤95° C., ≤ or 90° C.

In one embodiment. the combined amount of ethylene-based feed fed to the first and second reaction zones is from 20 wt % to 52 wt %, or from 20 wt % to 48 wt %, of from 20 wt % to 44 wt %, based on the total amount of ethylene-based feeds fed to the polymerization.

In one embodiment, the reactor system comprises at least three an ethylene-based feeds, and wherein one feed is fed to a first reaction zone (where i=1), and the other feeds are each fed to a different subsequent reaction zone, selected from the following: at least two of zone i, or zone j, or zone k, where i>1, j>i, k>j, and wherein at least one of the following ratios are met:

c) for three ethylene-based feeds, FE1, FEi, FEj, each represent the ratio of the respective weight fraction of make-up ethylene in the ethylene-based feed to the respective reaction zone (1, i or j), based on the total weight of the ethylene-based feed to this reaction zone; and wherein the ratios RFEj≥RFEi≥RFE1 are met, wherein RFEj=FEj/FE1, RFEi=FEi/FE1 and RFE1=FE1/FE1;

d) for four or more ethylene-based feeds, FE1, FEi, FEj, FEk, each represent the ratio of the respective weight fraction of make-up ethylene in the ethylene-based feed to the respective reaction zone (1, i. j or k), based on the total weight of the ethylene-based feed to this reaction zone; and wherein the ratios RFEk≥RFEj≥RFEi≥RFE1 are met, wherein RFEk=FE1/FEk, RFEj=FE1/FEj, RFEi=FE 1/FEj and RFE1=FE1/FE1; and wherein the "total amount of ethylene fed to the polymerization process" derives from at least one make-up ethylene stream and at least one recycled ethylene stream.

wherein the "total amount of ethylene fed to the polymerization process" derives from at least one make-up ethylene stream and at least one recycled ethylene stream.

In one embodiment, the ethylene based feed is fed to a first reaction zone (1) and to two subsequent reaction zones 2 and 3, and wherein RZ3≥RZ2≥RZ1, wherein each RZn (here, n=1, 2 or 3) is the mole fraction of make-up ethylene in the ethylene based feed stream to the reaction zone n, based on the total molar amount of ethylene-based feed to the nth reaction zone (ethylene plus optional comonomer(s) plus optional CTA(s) fed to the nth reaction zone). In one embodiment, the ethylene based feed is fed to a first reaction zone (1) and to three subsequent reaction zones 2, 3, 4, and wherein RZ4≥RZ3≥RZ2≥RZ1, wherein each RZn (here, n=1, 2, 3 or 4) is the mole fraction of make-up ethylene in the ethylene based feed stream to the reaction zone n. In one embodiment, the ethylene based feed is fed to a first reaction zone (1) and to four subsequent reaction zones 2, 3, 4, 5 and wherein RZ5≥RZ4≥RZ3≥RZ2≥RZ1, wherein each RZn (here, n=1, 2, 3, 4 or 5) is the mole fraction of make-up ethylene in the ethylene based feed stream to the reaction zone n.

In one embodiment, the first ethylene based feed stream comprises from 0 to 100 mole %, or from 10 to 100 mole %, or from 20 to 100 mole %, of the total amount of make-up CTA added to the polymerization, and wherein the activity of the CTA system in the first ethylene based feed stream is greater than, or equal to, the activity of the CTA system in each subsequent ethylene based feed stream. In one embodiment, the activity of the CTA system in the first ethylene based feed stream is equal to the activity of the CTA system in the second ethylene based feed stream. In another embodiment, the activity of the CTA system in the first ethylene based feed stream is greater than the activity of the CTA system in the second ethylene based feed stream. In one embodiment, the activity of the CTA system in the first ethylene based feed stream is equal to the activity of the CTA system in the third ethylene feed stream. In another embodiment, the activity of the CTA system in the first based ethylene feed is greater than the activity of the CTA system in the third ethylene based feed stream. In one embodiment, the activity of the CTA system in the first ethylene based feed stream is equal to the activity of the CTA system in the fourth ethylene based feed stream. In another embodiment, the activity of the CTA system in the first ethylene based feed is greater than the activity of the CTA system in the fourth ethylene based feed stream.

In one embodiment, the mixture further comprises at least one CTA selected from an aldehyde, an alkane, a ketone, an alcohol, an ester, a mercaptan, a phosphine, a phosgene, an alpha-olefin, or a combination thereof. In one embodiment, the mixture further comprises at least one CTA selected from an aldehyde, an alkane, a ketone, an alcohol, an ester, an alpha-olefin, or a combination thereof. In one embodiment, the mixture further comprises at least one CTA selected from an aldehyde, an alkane, a ketone, an ester, an alpha-olefin, or a combination thereof.

In one embodiment, the total ethylene based feed flow to the reactor configuration is from 30 to 400 tons per hr, or from 50 to 400 tons per hour, or from 75 to 400 tons per hour, or from 100 to 400 tons per hour. In one embodiment, the total ethylene based feed flow to the reactor configuration is from 40 to 350 tons per hour, or from 50 to 300 tons per hour. In one embodiment the reactor configuration comprises at least one tubular reactor.

In one embodiment, the first reaction zone is a tubular reaction zone. In one embodiment, each reaction zone is a tubular reaction zone. In one embodiment, the total number of reaction zones equals i, and wherein i is greater than, or equal to, 4, or ≥5, or ≥6, or ≥7, or ≥8, or ≥9, or ≥10, or ≥20. In one embodiment, the process comprises 4, or 5, or 6, or more ethylene feed streams.

In one embodiment, the ethylene based feed fed to the first reaction zone is at least 20 mol % of the total ethylene based feed fed to the polymerization. In one embodiment, the ethylene based feed fed to the first reaction zone is from 20 to 60, or from 20 to 55, or from 20 to 50, or from 20 to 45, or from 20 to 40, or from 20 to 35 mol % of the total ethylene based feeds fed to the polymerization. In one embodiment, the combined amount of the ethylene based feeds fed to the first and second reaction zones is at least 40 mole % of the total ethylene based feeds fed to the polymerization. In one embodiment, the combined amount of the first and second ethylene based feeds feed streams each comprise from 40 to 85, or from 40 to 75, or from 40 to 70, or from 40 to 65, or from 40 to 60, or from 40 to 55 mol %, of the total ethylene based feeds fed to the polymerization. In one embodiment, the sum of the ethylene based feeds fed to the first, second and third reaction zones is at least 60 mole % of the total ethylene-based feeds fed to the polymerization. In one embodiment, the sum of the ethylene fed to the first, second and third reaction zones is from 60 to 100, or from 60 to 90, or from 60 to 80, or from 60 to 70 of the total ethylene-based feeds fed to the polymerization.

In one embodiment, the make-up ethylene does not contain a chain transfer agent other than one or more residual compounds originating from the ethylene production/fractionation process.

In one embodiment, the make-up (fresh) ethylene, used in the polymerization, is only distributed to the reaction zone n, where (n>1). In one embodiment, the make-up ethylene, used in the polymerization, is only distributed to the reaction zone n+1, where (n>1). In one embodiment, the make-up ethylene, used in the polymerization, is only distributed to the reaction zone n+2, where (n>1). In one embodiment, the make-up ethylene is only distributed to the reaction zone n and n−1, where (n>1). In one embodiment, the make-up ethylene, used in the polymerization, is only distributed to the reaction zone n+1 and n+2, where (n>1). In one embodiment, the make-up ethylene, used in the polymeri-zation, is distributed to all reaction zones.

In one embodiment, the make-up (fresh) CTA, used in the polymerization, is only distributed to the first reaction zone. In one embodiment, the total amount of make-up CTA is only distributed to the first two reaction zones. In one embodiment, make-up CTA, used in the polymerization, is only distributed to the second and third reaction zone. In one embodiment, the make-up CTA, used in the polymerization, is distributed to all reaction zones receiving and ethylene-based feed stream.

In one embodiment, each feed to each reaction zone contains the same CTA system. In one embodiment, each feed to each reaction zone contains a CTA system different in composition and/or amount. In one embodiment the CTA system of each feed contains a single CTA. In one embodiment, no make-up CTA is distributed to the first reaction zone.

In one embodiment, the polymerization process carried out at an elevated pressure of at least 1000 bar (100 MPa), or at least 1300 bar (130 MPa), or at least 1600 bar (160 MPa). In one embodiment, the inlet pressure of the tubular reactor system is ≥1600 bar (160 MPa), or ≥1800 bar, or ≥2000 bar, or ≥2200 bar, or ≥2400 bar. In one embodiment, the inlet pressure of the tubular reactor system is ≤4000 bar (400 MPa), or ≤3700 bar, or ≤3400 bar, or ≤3200 bar, or ≤3000 bar, or ≤2800 bar, or ≤2600 bar, or ≤2500 bar, or ≤2400 bar. In one embodiment, the maximum pressure capability of the reactor system is ≤500 MPa, or ≤450 MPa, or ≤400 MPa, or ≤390 MPa, or ≤380 MPa, or ≤370 MPa, or ≤360 MPa, or ≤350 MPa, or ≤340 MPA, or ≤330 MPa, or ≤310 MPa, or ≤300 MPa, or ≤290 MPa, or ≤280 MPa, or ≤270 MPa, or ≤260 MPa, or ≤250 MPa, or ≤230 MPa. In one embodiment, each reaction zone, independently, is run at a maximum temperature less than 400° C., and an inlet pressure less than 500 MPa.

In one embodiment, the maximum polymerization temperature in the reaction zone 1, is ≤260° C., or ≤255° C., or ≤250° C., or ≤245° C. In one embodiment, the maximum polymerization temperature in the reaction zone 2, ≤240° C., or ≤235° C., or ≤230° C., or ≤225° C. In one embodiment, the maximum polymerization temperature in the reaction zone 2 and reaction zone 3, is each, independently, ≤240° C., or ≤235° C., or ≤220° C., or ≤225° C.

In one embodiment, the tubular reactor system comprises at least two heat transfer jackets, and where the heat transfer jackets of the first and second tubular reaction zones are operated with a heat transfer medium at an inlet temperature of ≥170° C., or ≥175° C., or ≥180° C., or ≥185° C., or ≥190° C., or ≥195° C. In one embodiment, when operating with four ethylene based feed streams, wherein the heat transfer jackets of the first, second and third tubular reaction zones are operated with a heat transfer medium at an inlet temperature of greater than, or equal to 175° C., or ≥180° C., or ≥190° C., or ≥195° C. In one embodiment, the reactor is operated with a periodic pressure pulsation or bump to remove or to reduce laminar or stagnant wall layer by a temporarily increase in process velocity.

In one embodiment, the reactor configuration comprises at least one tubular reactor, and each tubular reactor has one or more cooling zones. In one embodiment, the reactor configuration comprises at least one tubular reactor, and each tubular reactor is equipped with multiple heat transfer zones, and where heat is exchanged between the process side and a heat transfer medium. In one embodiment, the reactor configuration comprises at least one tubular reactor, and the cooling and/or heating to each reactor, is provided by liquid water operating in a co-current mode and/or counter current mode, in multiple cooling zones surrounding the reactor. In one embodiment, the reactor configuration comprises at least one tubular reactor, and the cooling and/or heating to each reactor, is provided by a liquid heat transfer fluid (for example, a silicon oil and/or a polygycol (e.g., DOWTHERM fluids)), operating in a co-current mode and/or counter current mode, in multiple cooling zones surrounding the reactor.

In one embodiment, the reactor configuration comprises at least one Primary compressor and at least one Booster compressor. In another embodiment, the process comprises only one Primary compressor.

In one embodiment, the ethylene-based polymer has a melt index (I2) from 0.10 to 20.0 g/10 min, or from 0.10 to 10.0 g/10 min, or 0.10 to 8.0 g/10 min, or 0.10 to 6.0 g/10 min.

In one embodiment, the ethylene-based polymer is a polyethylene homopolymer. In one embodiment, the ethylene-based polymer is LDPE.

In one embodiment, the ethylene-based polymer is an ethylene-based interpolymer comprising at least one comonomer. In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

Initiators

Free radical initiators are generally used to produce the inventive ethylene-based polymers. A free radical initiator, as used here, refers to a free radical generated by chemical and/or radiation means. Exemplary free radical initiators include organic peroxides, such as cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. Furthermore oxygen can be used as initiator. In one embodiment, these organic peroxide initiators are used in an amount from 0.001-0.2 wt %, based upon the weight of polymerizable monomers. The mixture of initiators, potentially diluted with a solvent, and potentially further diluted in a side ethylene based feed stream, injected into a reaction zone i is called initiation system for reaction zone i. In one embodiment oxygen is used alone, or in combination with other initiators, as a high temperature initiator. In one embodiment the initiator usage and efficiency are affected by the so-called cage-in effect or the potential to form effective polymerization radicals.

In one embodiment, an initiator is added to at least one reaction zone, and the initiator has a half-life temperature, at one second, greater than 255° C., preferably greater than 260° C. In a further embodiment, such initiators are used at a peak polymerization temperature from 320° C. to 350° C. In a further embodiment, the initiator comprises at least one peroxide group incorporated in a ring structure, such as TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See WO 02/14379 and WO 01/68723.

Additives and Applications

The invention also provides a composition comprising an ethylene-based polymer made by an inventive process. A composition may comprise one or more additives. Additives include, but are not limited to, antioxidants, plasticizers, antistatic agents, pigments, dyes, nucleating agents, fillers, slip agents, fire retardants, processing aids, smoke inhibitors, viscosity control agents and anti-blocking agents. The polymer composition may comprise less than 10% of the combined weight of one or more additives, based on the weight of the inventive polymer. A polymer composition may further comprise at least one other polymer, in addition to the ethylene-based polymer. Suitable polymers for blending with the inventive polymers include natural and synthetic polymers.

The compositions of this invention may be employed in a variety of conventional thermoplastic fabrication processes to produce useful articles; monolayer and multilayer films; molded articles, such as blow molded, injection molded, or rotomolded articles; coatings; fibers; and woven or non-woven fabrics. The compositions may also be used in a variety of films, including but not limited to, clarity shrink films, collation shrink films, cast stretch films, silage films, stretch hood, sealants, and diaper back sheets. Other suitable applications include, but are not limited to, wires and cables, gaskets and profiles, adhesives; footwear components, and automotive interior parts.

Definitions

Unless stated to the contrary, implicit from the context, or customary in the art, all amount, parts and percents are based on weight, and all test methods are current as of the filing date of this application.

The terms "ethylene based feed," or "ethylene feed stream," or "ethylene based feed stream," or "ethylene feed," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent etc.) and/or impurities (as for instance initiator degradation products) might be present in the feed stream.

The term "ethylene-based feed components," as used herein, refer to ethylene (make-up and/or recycled), and optionally CTA (make-up and/or recycled), solvent (make-up and/or recycled), comonomer(s) (make-up and/or recycled) and/or other components (for example, including, but not limited to, make-up and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (make-up and/or recycled), and optionally CTA (make-up and/or recycled), solvent (make-up and/or recycled), comonomer(s) (make-up and/or recycled) and/or other components selected from the following: make-up and/or recycled lubrication oil(s), antioxidant(s), ethane, methane and/or initiator dissociation products.

The term "LCB content" refers to a level of long chain branches per 1000 carbons (total carbons) incorporated in the polymer. The LCB content is calculated with the help of kinetics on "Transfer to Polymer" and "Propagation" of ethylene and optionally present comonomers. Comonomers containing a C=C double bond are represented in the calculation of the LCB level per 1000 C by their two carbons in their double bond group. The LCB content can be given as level in the final polymer (final product LCBf), in the progressing polymer formation along the reactor (cumulative LCBf) or in the locally formed polymer as function of the local polymerization conditions in the reactor (local LCBf).

The terms "ethylene conversion" refer to weight percentage of the total amount of ethylene fed to the reactor, which is incorporated into the final polymer produced; and {[(weight of polymer produced)/(total weight of ethylene fed to the reactor]×100}=ethylene conversion in wt %]. When propylene is used as a chai transfer agent, the amount of propylene is included in the calculation, such that, {[(weight of polymer produced)/(total weight of ethylene and propylene fed to the reactor]×100}=ethylene conversion in wt %].

The term "composition," as used herein, includes a mixture of materials which comprise the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. Trace amount of impurities can include initiator residues and other components, like for instance lubrication oil, solvent etc., showing chain transfer activity.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types.

The term "high pressure polymerization process," as used herein, refers to a free radical polymerization process carried out at an elevated pressure of at least 1000 bar (100 MPa).

The terms "inlet stream" or "reaction zone inlet stream," as used herein, refer to the total mass flow or total molar flow at the inlet of a reaction zone, and consists of the mass flow or molar flow transferred from the previous reaction zone plus optional ethylene-rich feed streams, plus optionally CTA feed stream, plus optionally initiator feed stream fed optionally alone or together with another feed stream. The terms "side stream" or "side feed stream," as used herein, refer to the ethylene-based feed stream, CTA system feed stream, and/or initiator system, to sequential reaction zones.

The term "reactor system," as used herein, refers to the devices used to polymerize and isolate a polymer. Such devices include, but are not limited to, one or more reactors, one or more feed streams, reactor pre-heater(s), monomer-reactor cooling device(s), Secondary compressor(s) (or Hyper compressor(s)), Primary compressor(s), and/or Booster compressor(s). The term "tubular reactor system," as used herein, refers to a reactor system that comprises only one or more tubular reactor(s) as the reactor(s) of the reactor system, and exclude autoclave reactors. When more than one tubular reactor is used, they are preferably used in a series configuration. The term "reactor configuration," as used herein, refers to one or more reactors, and optionally one or more reactor pre-heaters, used to polymerize a polymer.

The terms "inlet pressure," or "reactor inlet pressure," or "inlet pressure of the tubular reactor system," or similar terms, as used herein, refers to the pressure level at the inlet of the first reaction zone.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone typically begins with the addition of make-up and/or recycled ethylene, and/or free radicals or components which dissociate into and/or generate free radicals.

The term "first reaction zone" as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, make-up, recycled ethylene, CTA(s), solvent(s) and/or comonomer(s).

The phrase "peak temperature in a reaction zone," or similar phrases, as used herein, refers to the highest temperature measured in a reaction zone, for example, in an autoclave reaction zone (typically, noted as a maximum zone temperature), and in a tubular reaction zone (typically noted as a peak temperature).

The Booster compressor (Booster) is a device that compresses the following: a) the low pressure recycle coming from the LPS (Low Pressure Separator), and b) optionally, the recycled compressor packing leaks, each to the pressure level required at the inlet side of the Primary compressor. A Booster can consist of single or multiple compressor frames, and can be potentially combined with Primary compressor frame(s). The Primary compressor (Primary) is a device that compresses the following: a) the incoming ethylene, and/or b) the low pressure recycle coming from the Booster, and/or c) the recycled compressor packing leaks, each to the pressure level required to feed the inlet side of the Hyper compressor. The Primary can consist of single or multiple compressor frames, and can be potentially combined with Booster compressor frame(s). Hyper compressor (Hyper), or Secondary compressor, is a device that compresses the following: a) ethylene-based components coming from the HPR (High Pressure Recycle), and/or b) ethylene-based components coming from the Primary; each to a pressure level required to feed the reactor at its inlet pressure. This compression can take place in one or multiple compression stages. The Hyper comprises a plunger reciprocating compressor, and can consist of single or multiple compressor frame(s). For these devices, each compression can be combined with intermediate cooling.

The term "make-up," when used herein, in reference to an ethylene-based feed component (i.e., "make-up ethylene or make-up ethylene feed," "make-up CTA or make-up CTA feed"), refers to reactant, provided from an external source(s), and not provided internally from a recycled source(s). For example, in an embodiment, make-up ethylene is used as "make-up ethylene" required to compensate for the ethylene consumed by the polymerization and/or lost through, for example, ethylene purge from the process and residual ethylene in the polymer.

The term "recycled," when used herein, in reference to a reactant (i.e., "recycled ethylene or recycled ethylene feed," "recycled CTA or recycled CTA feed"), refers to unreacted reactant separated from the polymer in the high pressure separator(s) and/or the low pressure separator(s), and returned/compressed to the reactor.

The terms "feed," "feed flow," or "feed stream," as used herein, refers to make-up and/or recycled components (for example, ethylene, initiator, CTA, and/or solvent) added to a reaction zone at an inlet.

The term "start temperature" as used herein, refers to the temperature at the first inlet of a reaction zone. Typically, each reaction zone has only one inlet.

The term "feed temperature," as used herein, refers to inlet temperature at the reactor. A feed temperature may be equal to the discharge temperature of a hyper compressor; or may be less than the discharge temperature of a hyper compressor, for example, if cooled using a cooler, for example, a cooling jacket surrounding the feed line to the reactor.

The term "mole fraction," as used herein, refers to the molar ratio of one component in a mixture to the total moles of the components of the mixture. Mole fraction can be determined by calculating the ratios of molar amounts or molar flows.

The term "initiator system" includes a single initiator, or a mixture of initiators, each typically dissolved in a solvent (for example, a hydrocarbon solvent) added to the polymerization process. Initiator systems comprising one or a mixture of initiators and are typically injected into the reactor at different locations, to create multiple reaction zones, and thus creating a multiple zone temperature profile.

The term "injection point," as used herein, refers to the inlet location of a device (used in a polymerization process) where a feed stream is added into the device.

The term "feed conditions", as used herein, refers to the flows, in moles, of the components fed to the reactor, for instance ethylene, CTA, initiators and/or co-monomer(s).

The term "process velocity in reaction zone i", as used herein, is the volume flow of process or ethylene-based component divided by the cross-section area of the reactor tube, used in a reaction zone, and is calculated as follows:

$$v_i = \frac{4 \times \phi_i}{\pi d_i^2} [m/s], \qquad \text{(Eqn. VA)}$$

where $\phi_i$ [m³/s] is the volume flow of total components (including monomer, comonomer, CTA, impurities, etc.) fed to the reaction zone i, calculated by dividing the total mass flow fed to reaction i to the density of the flow; and $d_i$ [m] is the internal tube diameter of the reactor zone i. The term "average process velocity in reaction zone i" refers to the process velocity averaged over the length of reaction zone i.

The pressure level in a high pressure reactor is controlled by a control valve (letdown valve) in the outlet of the reactor. The term "bump" refers to periodic pressure pulsation in order to remove or reduce wall layer by temporarily increasing the velocity in a tubular reactor.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer.

The terms "CTA activity" or "chain transfer activity coefficient (Cs value)" as used herein, refer to the ratio between the "rate of chain transfer" to the "rate of ethylene propagation." See Mortimer references provided in the experimental section below. The terms "Z1 and Zi" as used herein is determined as follows. The "reactor zone molar concentration of a $CTA_j$ in a reactor zone i ($[CTA]_{ji}$)" is defined as the "total molar amount of that CTA fed into reactor zones k=1 to k=i" divided by the "total molar amount of ethylene fed into reactor zones 1 to i." Note i≥1. This relationship is shown in Eqn. AC.

$$[CTA]_{j_k} = \frac{\sum_{k=1}^{i} n_{CTA,j_k}}{\sum_{k=1}^{i} n_{eth_k}}. \qquad \text{(Eqn. AC)}$$

In Equation AC, j≥1, $n_{CTA,j_k}$ is the "amount of moles of the jth CTA injected to the kth reactor zone (where k=1 to i)," and $n_{eth_k}$ is the "amount of moles of ethylene injected to the kth reactor zone (where k=1 to i)." The "transfer activity of a CTA (system), or activity of a CTA system, in a reactor zone i (Zi)" is defined as the "sum of the reactor zone molar concentration of each CTA in the reactor zone" multiplied with its chain transfer activity constant (Cs)—see Eqn. BC. The chain transfer activity constant (Cs) is the ratio of reaction rates Ks/Kp, at a reference pressure (1360 atm) and a reference temperature (130° C.). This relationship is shown below in Equation BC, where $n_{compi}$ is the total number of CTAs in reactor zone i. Note i≥1, and $n_{compi} \geq 1$.

$$Z_i = \sum_{j=1}^{n_{compi}} [CTA]_{j_i} \cdot C_{s,j}. \qquad \text{(Eqn. BC)}$$

The chain transfer constant (Cs) values for some chain transfer agents are shown below in Table A, showing chain transfer constants (Cs) derived by Mortimer at 130° C. and 200° C., and at 1360 atm, for the shown chain transfer agents.

TABLE A

Cs-Values as Measured by Mortimer at 130° C., or 200° C., and 1360 atm, in References 1-3 and Derived Activation Entities

| Component | Cs at 130° C., 1360 atm value | dev | Cs at 200° C., 1360 atm value | dev | ΔEa cal/mole | dev |
|---|---|---|---|---|---|---|
| Methane | 0 | ±0.0002 | | | | |
| Ethane | 0.0006 | ±0.0005 | | | | |
| Propane | 0.00302 | ±0.0003 | 0.00652 | ±0.00002 | 4200 | ±300 |
| Isobutane | 0.0072 | ±0.0003 | 0.0136 | ±0.0005 | 3500 | ±600 |
| n-Decane | 0.012 | ±0.001 | | | | |
| Propylene | 0.012 | ±0.0008 | 0.02 | ±0.0006 | 2700 | ±800 |
| Butene-1 | 0.047 | ±0.002 | 0.057 | ±0.004 | 1100 | ±1000 |
| Propional-dehyde (PA) | 0.33 | ±0.01 | 0.283 | ±0.004 | −800 | nd |

The phrase "weight fraction of make-up ethylene fed to the first reaction zone (FE1)," as used herein, refers to the weight fraction of make-up ethylene fed (via a front stream) to the first reaction zone divided by the total weight amount of ethylene-based feed to the first reaction zone (ethylene plus optional comonomer(s) plus optional CTA(s) fed (via a front stream) to the first reaction zone).

The phrase "weight fraction of make-up ethylene fed to the nth reaction zone (FEn)," as used herein, refers to the weight fraction of make-up ethylene fed (via a side stream) to the nth reaction zone divided by the total weight amount of ethylene-based feed to the nth reaction zone (ethylene plus optional comonomer(s) plus optional CTA(s) fed (via a side stream) to the nth reaction zone).

The term "RFFn=FE1/FEn", as used herein, refers to, for reaction zone n, the ratio of the "weight fraction of make-up ethylene fed to the first reaction zone (RFE1)" to the "weight fraction of make-up ethylene fed to reaction zone n (RFEn)". Assumptions Used for RFEn Calculation in all Configurations from FIG. 1 to FIG. 5:

Stream 13 and 15 have the same amount of CTA. The polymer going from HPS to LPS contains 20 wt % of additional ethylene. Stream 13 is 20 wt % of the polymer output of stream 12. Stream 1 (make-up ethylene) is the ethylene conversion=purge flow (stream 16) which is 1 wt %. FE1 is the ratio of the weight fraction of make-up ethylene in the front (mx zone 1) ethylene based feed stream vs. the total (weight) amount of the front ethylene based feed stream. FE2 is the ratio of the weight fraction of make-up ethylene in the first side (mx zone 2) ethylene based feed stream vs. the total amount of the first side ethylene based feed stream. FE3 is the ratio of the amount of make-up ethylene in the second side (mx zone 3) ethylene based feed stream vs. the total amount of the second side ethylene based feed stream.

Example IP6.1 Reactor Configuration 30/30/40/0/0

Ethylene conversion: 33 wt %. Purge flow: 1 wt %. Ethylene in the Polymer from LPR: 6.6 wt %. Make-up ethylene conc. at the outlet of the primary=(33%+1%)/(33%+1%+6.6%)=84%. Make-up ethylene concentration to the front (mx. zone 1) FE1=0. Make-up ethylene conc. in the $2^{nd}$ side stream (mx. zone 3) FE3=(33%+1%)/(33%+1%+7%)*40%/40%≈0.8. Make-up ethylene conc. to the first side stream (mx. zone 2) FE2=(33%+1%+6.6%−40%)*84%/30%=0.02. Make-up ethylene concentration in the $2^{nd}$ side stream, FE3=0. RFE2=FE1/FE2=0/0.02=0. RFE3=FE1/FE3=0/0.8=0.

Test Methods

Melt Index—

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Experimental

Flow Scheme for CP1.1, IP1.1, CP1.2, CP3.1, IP3.1, CP3.2, CP5.1 Through CP10.1, CP5.2 Through CP10.2, IP5.1 through IP10.1, CP6.1.1, IP6.1.1 and CP6.1.2

Figure 1:
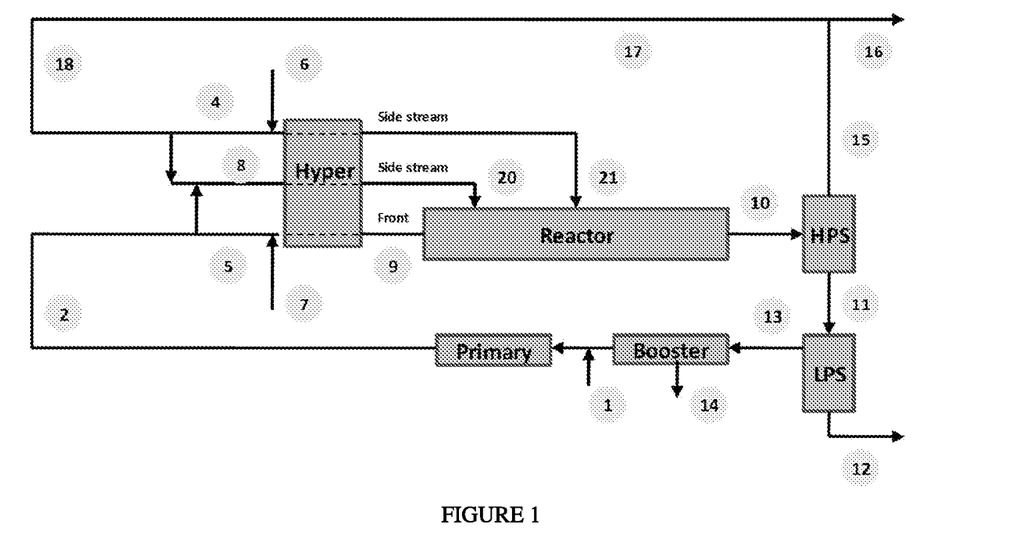
FIG. 1 depicts a process flow diagram containing a tubular reactor, and used for CP1.1, IP1.1, CP1.2, CP3.1, IP3.1, CP3.2, CP5.1 through CP10.1, CP5.2 through CP10.2, IP5.1 through IP10.1, CP6.1.1, IP6.1.1 and CP6.1.2.

FIG. 1 shows a generalized flow scheme of a simulated, high pressure polymerization reactor system containing a tubular reactor with three ethylene feed flows. The HPR flow (line 18) and the Primary discharge flow (line (2)) are sent to the suction side of the Hyper through among others line (4), line (5) and line (8). The suction side of the Hyper is equipped with three separate suction inlets. The three suction inlet flows are kept separated during compression and discharge and are fed separately to the reactor through (9), line (20) and line (21). The only connection between co-pressed flows is potentially balancing lines equipped with orifices to restrict the flow dampening pressure pulsation.

The HPR flow (line 18) is mainly sent through line (9) to the reactor, while the Primary discharge flow (2) is mainly sent to the side of the reactor through line (21). The remaining flow from Primary and HPR are combined and is compressed in the Hyper and fed to the reactor through line (20). In this flow scheme, the first reaction zone has the highest level of CTA (utilized from HPR) while the third reaction zone receives a flow with the lowest CTA concentration (from Primary). The CTA concentration in the flow to the second reaction zone has a composition mixture of HPR and Primary flow and is of feed concentration (between the first and third reaction zones). The Hyper pressurizes the ethylene feed stream to a level sufficient to feed the high pressure tubular reactor (Reactor). The discharge temperature of the Hyper is typically between 60 and 100° C. The ethylene feed to the first reaction zone is typically pre-heated to a temperature from 130 to 180° C., while the remaining ethylene, sent to a side feed to the reactor, is fed at Hyper discharge temperature, or cooled prior to feeding to the reactor.

In the reactor, the polymerization is initiated with the help of a free radical initiation system(s) injected, and/or activated, at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (line 10), and separated in the high pressure separator (HPS). The HPS separates the reaction mixture into an ethylene rich stream (line 15), containing minor amounts of waxes and/or entrained polymer, and a polymer rich stream (line 11), which is sent to the LPS for further separation. Ethylene stream (line 15) is cooled and cleaned in stream (17) and returned through line (18) to the suction side of the Hyper. Stream (16) is a purge stream to remove impurities and/or inerts.

The polymer separated in LPS is further processed in (line 12). The ethylene removed in the LPS is fed to the Booster (see line 13), where, during the compression, condensables such as solvent, lubrication oil, and others components, are collected and removed through stream (line 14). The outlet of the Booster is combined with make-up ethylene stream (line 1), and further compressed by the Primary.

Stream (6) and/or (7) depict the CTA system make-up feed. Line (7) depicts CTA injection in either stream (5) and/or stream (8). CTA make-up (line 6) and/or (line 7) can be fed in the inlet(s), interstage(s), outlet(s) of the Hyper, and/or inlet(s) of the reaction zones. All other remaining parts of the reactor system are described above for FIG. 1.

Flow Scheme used for CP4.1, IP4.1 and CP4.2

Figure 2:
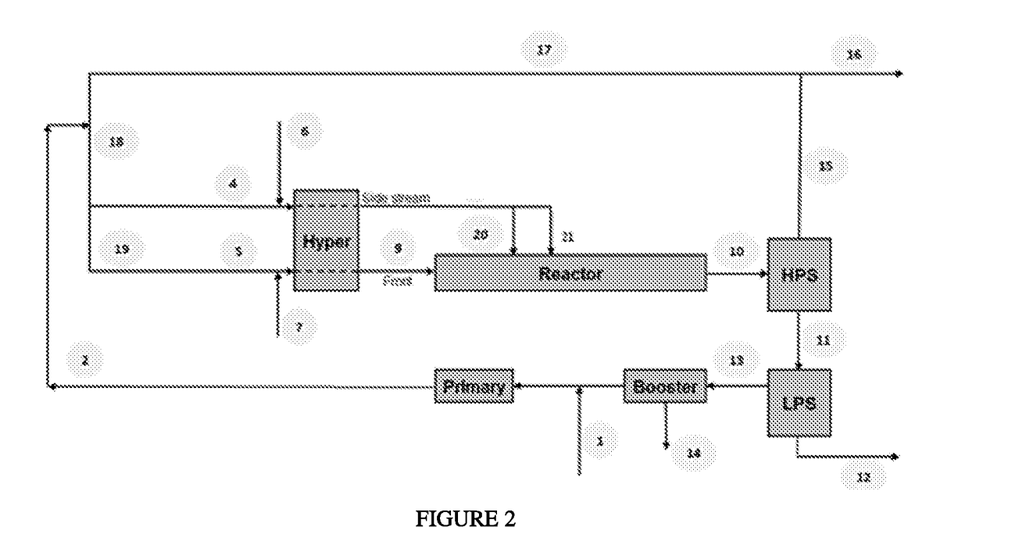
FIG. 2 depicts a process flow diagram containing a tubular reactor, and used for CP4.1, CP4.2, and IP4.1.

FIG. 2 shows a generalized flow scheme of a simulated, high pressure polymerization reactor system with three ethylene based feed distribution (30/30/40/0/0). This flow scheme is used for CP4.1, IP4.1 and CP4.2 examples In this flow scheme, High Pressure Recycle flow (line 17) is combined with Primary compressor flow (line 2) to form stream (18) and distributed over the suction side of the Hyper. It means that the "Make-up ethylene" coming from line (1) is evenly distributed over the reaction zones through line (4) and line (5). The Hyper pressurizes the ethylene feed stream to a level sufficient to feed the high pressure tubular reactor (Reactor). The discharge temperature of the Hyper is typically between 60 and 100° C. The ethylene feed to the first reaction zone is typically preheated to a temperature from 130 to 180° C., while the remaining ethylene, sent as side feeds to the reactor, is fed at the Hyper discharge temperature, and/or cooled prior to feeding to the reactor.

The discharge flow from the Hyper is then distributed over the front (first reaction zone—line 9) and side (line 20 and 21) of the reactor. It thus results in even "Make-up ethylene" concentration in the ethylene based feed flows to the reactor.

Stream (6) and/or (7) depict the CTA system make-up feed. CTA make-up (line 6) and/or (line 7) can be fed in the inlet(s), interstage(s), outlet(s) of the Hyper, and/or inlet(s) of the reaction zones. In case of CP4.1, IP4.1 and CP4.2 the CTA is pro ratio distributed over the reactor feed flows (9), (20) and (21) resulting in even CTA concentrations in these reactor feed flows. All other remaining parts of the reactor system are described above for FIG. 1.

Flow Scheme of CP11.1, CP 12.1, CP11.2, CP12.2, IP11.1 and IP 12.1.

Figure 3:
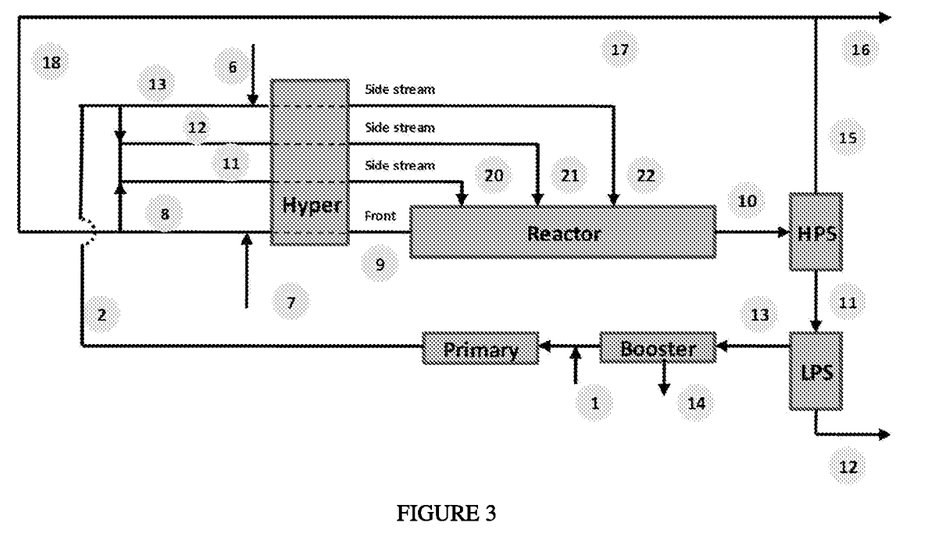
FIG. 3 depicts a process flow diagram containing a tubular reactor, and used for CP11.1, CP12.1, CP11.2, CP12.2, IP11.1, and IP12.1.
Figure 4:
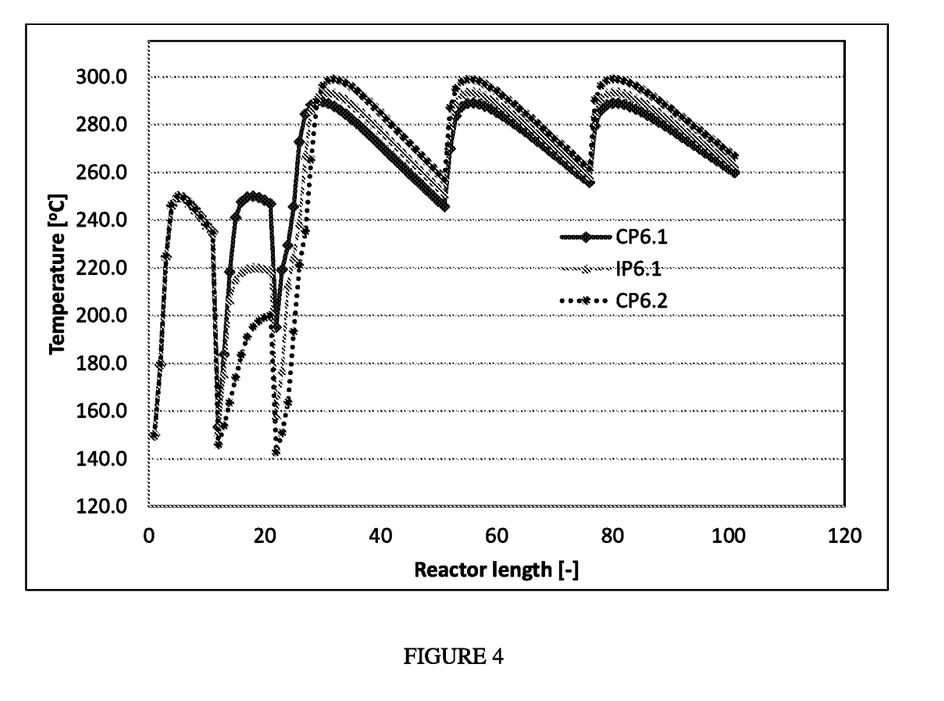
FIG. 4 depicts the temperature profiles for 30/30/40/0/0 ethylene feed configuration operating with respectively Δ(TP1−TP2)=0° C., Δ(TP1−TP2)=30° C., and Δ(TP1−TP2)=50° C.
Figure 5:
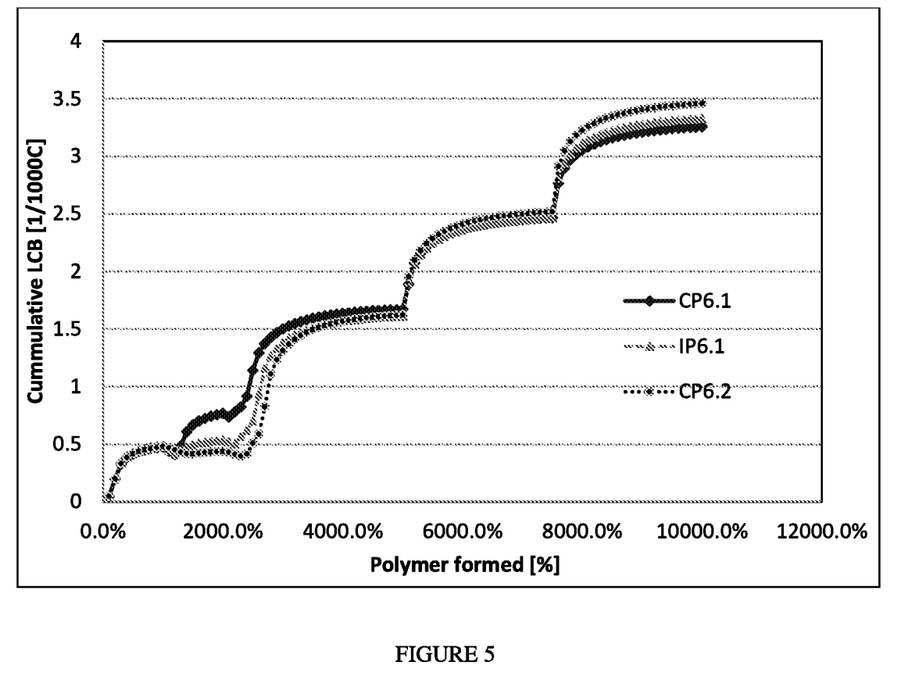
FIG. 5 depicts the LCB developments for a 30/30/40/0/0 ethylene feed configuration, operating with respectively Δ(TP1−TP2)=0° C., Δ(TP1−TP2)=30° C., and Δ(TP1−TP2)=50° C.

FIG. 3 shows a generalized flow scheme of a simulated, high pressure polymerization reactor system containing a tubular reactor with four ethylene feed flows The HPR flow (line 18) and the Primary discharge flow (line (2)) are sent to the suction side of the Hyper. The suction side (line (8), (11), (12) and (13)) of the Hyper is equipped with four separate suction inlets. The four suction inlet flows are kept separated during compression and discharge and are fed separately to the reactor through (9), line (20), line (21) and line (22). The HPR flow (line 18) is mainly sent through line (9) and (20) to the reactor, while the Primary discharge flow (2) is mainly sent to the side of the reactor through line (22). The remaining flow from Primary (2) and HPR (18) are respectively preferentially sent through line (21) to the reactor. In the simulated cases line (20) consist of an ethylene based feed originating from HPR, while line (21) has a combined composition originating from HPR and Primary. In the simulated cases as much of the make-up ethylene originating from line (1) is sent to the back reaction zone(s), while as much of the ethylene based flow originating from HPR is sent to the front reaction zone(s).

Stream (6) and/or (7) depict the CTA system make-up (make-up) feed Stream (7) can be preferentially sent to line (8) and/or line (11) while stream (6) can be preferentially sent to line (12) and/or (13). CTA make-up streams (line 6) and/or (line 7) can be fed in the inlet(s), interstage(s), outlet(s) of the Hyper, and/or inlet(s) of the reaction zones. All other remaining parts of the reactor system are described above for FIG. 1.

Polymerization Simulations

A polymerization simulation model with applied reaction scheme and kinetics is described by Goto et al. (Goto et al; Journal of Applied Polymer Science: Applied Polymer Symposium, 36, 21-40, 1981 (Title: Computer model for commercial high pressure polyethylene reactor based on elementary reaction rates obtained experimentally. Other reactor and product modeling frameworks are available through ASPEN PLUS of Aspen Technology, Inc., Burlington, Mass., USA; and PREDICI of Dr. Wulkow, Computing in Technology GmbH (CiT), Rastede, Germany. Process and product responses predicted by these model frameworks are determined by the reactor parameters, the applied reaction scheme, and kinetic parameters. The applied reaction scheme and kinetic parameters are described below.

The polymerization simulations were achieved with Goto, LDPE simulation model, as discussed above. The kinetic data used by Goto et al. was derived from high pressure, free radical polyethylene polymerization experiments, performed at varying temperature, pressure and polymer concentration, as described in the following references: K. Yamamoto, M. Sugimoto; *Rate constant for long chain-chain branch formation in free-radical polymerization of* ethylene; *J. Macromol. Science-Chem.*, A13 (8), pp. 1067-1080 (1979). The elementary reaction steps are described by Goto et al. as follows: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation. Kinetic data for main reactions are shown in Table 1, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as analyzed by C13 NMR technique) in high pressure polyethylene, as a function of pressure and temperature conditions.

TABLE 1

Kinetic Constants for Main Reactions

| | Reaction | | |
|---|---|---|---|
| | ko | Ea | $\Delta V$ |
| | Units | | |
| | [m³/(hr * kmol)] | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs is given in Table 2. The kinetic constants haven been calculated with the help of the kinetic constants on the Cs-value (ks/kp) as determined by Mortimer (see References below), and the ethylene propagation kinetics as given by Goto et al. (see Table 1).

TABLE 2

Kinetic Constants for Selected CTAs

| | Chain Transfer to Modifier | | | | |
|---|---|---|---|---|---|
| | kao | | | Reactivity Ratios | |
| Component | [m3/(hr * kmol)] | Ea (cal/mol) | $\Delta V$ (cc/mol) | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will typically lower the density of the polymer by 0.001 to 0.004 g/cc. Furthermore the comonomer activity will increase the consumption level per reactor pass, by which more propylene has to be added to compensate for the consumption as CTA as well as comonomer. References: General: G. Luft, *Chem.-Ing.-Tech., Hochdruck-Polyaethylen*, Vol. 51 (1979) Nr. 10, pages 960-969. Peroxide efficiency: T. van der Molen et al., *Ing. Chim. Ital*, "Light-off" temperature and consumption of 16 initiators in LDPE production, Vol. 18, N. 1-2, February 1982, pages 7-15.

Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at* 1360 *atm and* 130° *C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). See LDPE simulation model in S. Goto et al., *Journal of Applied Polymer Science: Applied Polymer Symposium*, 36, 21-40, 1981 (*Title: Computer model for commercial high pressure polyethylene reactor based on elementary reaction rates obtained experimentally*).

Tubular Reactor Simulations

Table 3A, 3B, 4A and 4B present the reactor configurations and process conditions for inventive and comparative polymerizations. The polymerizations are simulated for a high pressure tubular reactor, operating typically at a reactor inlet pressure of 280 MPa (2800 bar), using an ethylene-based throughput of 60 metric tons/hr. A tubular reactor configuration comprises up to several thousand meters of total length for four or more reaction zones. In this simulation study, the reactor length is varied from 1300 and 1500 meter. The inside diameters of the reactor tubes are varied to maintain a desired process velocity in the range of 12 to 14 m/s, thus providing a good flow regime for mixing, heat transfer as well as acceptable pressure drop in and over the reactor. The pressure drop over the reactor is kept at around 500 bar for all simulations.

The reactor configurations and ethylene distributions used in this simulation study are indicated in Table 3A and 3B. A reactor configuration with an ethylene distribution of 33/33/33/0 means 4 reaction zones and the first three reaction zones receive each ⅓ of the total ethylene based feed coming from the HPR and/or Primary.

A reactor configuration with an ethylene distribution of 25/25/25/25/0 means 5 reaction zones and the first four reaction zones receive each 25% of the total ethylene based feed coming from the HPR and/or Primary. Other reactor configurations and ethylene distributions covering 25/25/50/0/0, 40/40/20/0/0, 30/30/40/0/0 and 30/20/25/25/0 distributions are listed in Table 4A and 4B. Information on the distribution on make-up ethylene (FE1, FE2, FE3 and FE4), ratios of make-up ethylene concentrations over the ethylene based feed flows (RFE2, RFE3 and RFE4) and the ratio's over CTA concentrations over the cumulative feed flows to the reaction zones (Z1/Z2, Z1/Z3 and Z1/Z4) can be found in Table 4A and 4B.

All simulations have been done with an inlet temperature of the first reaction zone of 150° C. Propionaldehyde (PA), propylene and isobutane are used as a Chain Transfer Agent (CTA), which have an activity (Cs) of 0.33, 0.012 and 0.0072, respectively, and a corresponding conversion of around 10%, 20% and 1% per reactor pass, respectively. Propylene shows the highest conversion level due to its comonomer activity. In the simulations, the melt-index has been varied from 0.2, 1 and 10 g/10 min. The inventive principle can be easily expanded over a wider melt-index range by adjusting the concentration level of the applied CTA system.

Typically mixtures of Tert Butyl peroxy-2-ethylhexanoate (TBPO) and Di-tert-butyl peroxide (DTBP) have been used as ignition system; however with low start and/or reinitiation temperatures Tert Butyl peroxypivalate (TBPIV) was added or in case of lower peak temperature, 270 Deg C. or lower, DTBP was replaced by Tert Butyl peracetate (TBPA). The water temperatures, for cooling or heating the reaction zones, are operated with an inlet temperature of 190° C. and 155° C. in a counter current mode. Alternatively the water temperatures can be operated at other uniform or non-uniform settings. The cooling zones can be operated in a co- and/or countercurrent mode.

Normalized Molecular Weight Distribution (MWD)

Molecular Weight Distribution (representing the relationship between (dw/d log M) and log M) is an important parameter used in the polymerization designs, process development, improvement and operation. It is necessary to determine the types of polymer produced (narrow or broad MWD) which provide the desired product properties. Normalized MWD data can be obtained by using PREDICI commercial software package (licensed by Dr. M. Wulkow, Computing in Technology, GmbH, Pater-Klbe-Straβe 7, D-26180 Rastede, Germany), to construct MWD from polymerization kinetics (Goto kinetics in this study), through solving polymer population balance equations. The required inputs for PREDICI include the used Goto kinetics, and the monomer and/or co-monomer, initiator and CTA flows, temperature and pressure profiles, as well as elapsed time, all of which can be obtained from the process simulation. PREDICI software package can be used to generate normalized MWD data.

In each series of CPx.1, IPx.1 and CPx.2 the MWD of CPx1 was used for the normalization of the MWD values. For instance the MWD results for CP1.1, IP1.1 and CP1.2 were normalized with Eqn. 5:

$$MWD_{normalized(CPx.1, IPx.1, CPx.2)} = \frac{MWD_{example}}{MWD_{CPx.1}} \times 100\%. \quad (Eqn. 5)$$

An overall normalization of MWD values was performed by comparing all MWD results vs. MWD of CP1.1 according Eqn. 6:

$$MWD_{normalized} = \frac{MWD_{example}}{MWD_{CP1.1}} \times 100\%. \quad (Eqn. 6)$$

Discussion of Comparative and Inventive Polymerizations: CP1.1 Through CP12.2 and IP1.1 Through IP12.1

A. Reactor Configuration with Three Ethylene Based Flows:

The CP3.1 example has been done with the first two peak temperature at 240° C., while the last two peaks were adjusted to achieve an ethylene conversion level of 33%. In IP3.1 the second peak temperature was lowered to 220° C., while the first peak temperature was maintained at 240° C. and the last two peak temperatures were increased to 297° C. in order to maintain the ethylene conversion level at 33%. In CP3.2 the second peak temperature was lowered to 200° C., while the first peak temperature was maintained at 240° C. and the last two peak temperatures were increased to 300° C. in order to maintain the same ethylene conversion level. The resulting product properties as SCBf, LCBf and normalized) MWD values for CP3.1 and CP1.1. The relative trend in MWD values was investigated in each series of data through normalization versus a selected reference in a series, see table 5A and 5B. The data shows that increasing $\Delta(TP1-TP2)$ from 0 to 20° C. lowers the normalized MWD value from 100% to 97.4%, while increasing $\Delta(TP1-TP2)$ from 20 to 40° C. increases the normalized MWD versus IP1.1 from 97.4% to 99.5%. This trend has been repeated in the other simulation series (CPx.1, IPx.1 and CPx.2) describing reactor configuration with three ethylene based flows. In these series the ethylene based feed flow distribution, number of reaction zones, make-up ethylene distribution, type of CTA and product melt-index was varied among the series.

B. Reactor Configuration with Four Ethylene Based Flows:

The CP11.1 example has been done with the first three peak temperature at 240° C., while the last two peaks were adjusted to achieve an ethylene conversion level of 33%. In IP11.1 the second and third peak temperatures were lowered to 220° C., while the first peak temperature was maintained at 240° C. and the last two peak temperatures were increased to 313° C. in order to maintain the ethylene conversion level at 33%. In CP11.2 the second and third peak temperatures were lowered to 200° C., while the first peak temperature was maintained at 240° C. and the last two peak temperatures were increased to 321° C. in order to maintain the same ethylene conversion level. The resulting product properties as SCBf, LCBf and normalized MWD value for CP11.1 versus CP1.1 can be found in table 5A. The data shows that increasing $\Delta(TP1-TP2)$ and $\Delta(TP1-TP3)$, from 0 to 20° C., lowers the normalized MWD value from 100% to 94%, while increasing $\Delta(TP1-TP2)$ and $\Delta(TP1-TP3)$, from 20 to 40° C., increases the normalized MWD from 94 to 98% versus IP1.1. This trend has been repeated in the other simulation series (CPx.1, IPx.1 and CPx.2), where x can be 11 or 12 which are describing reactor configuration with four ethylene based flows. In these series the ethylene based feed flow distribution, number of reaction zones, make-up ethylene distribution, type of CTA and product melt-index was varied among the series.

IP11.1, IP11.2 and IP11.3 show that the full benefit in narrowing MWD is obtained when both the second and third peak temperatures are lowered. However, also a substantial narrowing MWD can be achieved by lowering the second or third peak temperature. IP11.5, IP11.1 and IP11.4, show the narrowing MWD can be further optimized by lowering the inlet temperature of the second, third and fourth ethylene based feed stream, for instance increasing the temperature of the second, third and fourth ethylene based feed stream from 70 to 40° C., lowered the normalized MWD from 105.3 to 94.1%, while lowering the temperature of the second, third and fourth ethylene based feed stream from 40 to 31° C. decreases the normalized MWD from 94.1% to 92%, while maintaining the lowest polymerization temperature in each reaction zone at 135° C. or higher.

Summary—

It has been discovered for reactor configuration with respectively three or four ethylene based feed flows that lowering the second and/or third peak temperatures by 10° C.≤$\Delta(TP1-TP2)$ and/or $\Delta(TP1-TP3)$≤30° C. while increasing the last peak temperatures in order to control the ethylene conversion at a desired level leads to narrower MWD products or to same MWD at a higher ethylene conversion level. Further lowering of $\Delta(TP1-TP2)$ and/or $\Delta(TP1-TP3)$ beyond 30° C. leads unexpectedly to broader MWD or lower ethylene conversion level at same MWD, thus resulting poorer reactor economics or product capability. It has also been discovered that the positive impact of the inventive operation (lowering of second and/or third peak temperatures) is further enhanced by lowering the second, or third, or fourth temperatures of ethylene based feed stream.

TABLE 3A

Process Configurations and Operating Conditions for several ethylene-based polymers

| Ethylene feed distribution* EBF1/EBF2/ EBF3/EBF4 | Ex. | Feed temp.** EBF2/EBF3/EBF4 [° C.] | Peak temp. TP1/TP2/TP3/TP4 [° C.] | Start temps of reaction zones [° C.] | BW*** [° C.] | Convn. wt % | Reactor inlet pressure bar |
|---|---|---|---|---|---|---|---|
| | Ethylene feed stream 33/33/33/0, reactor length 150/150/675/375 (m) and reactor inside diameter 31/45/54/54 (mm) for different reaction zones |
| 33/33/33/0 | CP1.1 | 40/40/40 | 240/240/294/294 | 150/139/176/219 | 190/190/155/155/155 | 31.2 ± 0.1 | 2800 |
|  | IP1.1 | 40/40/40 | 240/220/299/299 | 150/138/162/222 | 190/190/155/155/155 | 31.2 ± 0.1 | 2800 |
|  | CP1.2 | 40/40/40 | 240/200/302/302 | 150/138/148/224 | 190/190/155/155/155 | 31.2 ± 0.1 | 2800 |
| | Ethylene feed stream 25/25/50/0/0, reactor length 150/150/450/375/375 (m) and reactor inside diameter 27/38/54/54/54 (mm) for different reaction zones |
| 25/25/50/0/0 | CP2.1 | 40/40/40 | 240/240/294/294/294 | 150/136/142/252/259 | 190/190/155/155/155 | 33.0 ± 0.1 | 2800 |
|  | IP2.1 | 40 | 240/227/296/296/296 | 150/136/135/256/260 | 190/190/155/155/155 | 33.0 ± 0.1 | 2800 |
| | Ethylene feed stream 40/40/20/0/0, reactor length 150/150/450/225/525 (m) and reactor inside diameter 34/48/54/54/54(mm) for different reaction zones |
| 40/40/20/0/0 | CP3.1 | 40 | 240/240/295/295/295 | 150/142/202/246/261 | 190/190/155/155/155 | 33.0 ± 0.1 | 2800 |
|  | IP3.1 | 40 | 240/220/297/297/297 | 150/142/186/248/262 | 190/190/155/155/155 | 33.0 ± 0.1 | 2800 |
|  | CP3.2 | 40 | 240/200/300/300/300 | 150/142/169/251/264 | 190/190/155/155/155 | 33.0 ± 0.1 | 2800 |
| | Ethylene feed stream 25/25/25/25/0, reactor length 120/120/120/615/525 (m) and reactor inside diameter 27/38/46/54/54 (mm) different reaction zones |
| 25/25/25/25/0 | CP11.1 | 40 | 240/240/240/309/309 | 150/139/176/192/240 | 190/190/190/155/155 | 33.0 ± 0.1 | 2800 |
|  | IP11.1 | 40 | 240/220/220/313/313 | 150/139/162/177/243 | 190/190/190/155/155 | 33.0 ± 0.1 | 2800 |
|  | IP11.2 | 40 | 240/220/240/310/310 | 150/139/162/193/240 | 190/190/190/155/155 | 33.0 ± 0.1 | 2800 |
|  | IP11.3 | 40 | 240/240/220/313/313 | 150/139/176/177/242 | 190/190/190/155/155 | 33.0 ± 0.1 | 2800 |
|  | IP11.4 | 31 | 240/220/220/313/313 | 150/135/159/175/243 | 190/190/190/155/155 | 33.0 ± 0.1 | 2800 |
|  | IP11.5 | 70 | 240/220/220/318/318 | 150/154/171/184/243 | 190/190/190/155/155 | 33.0 ± 0.1 | 2800 |
|  | CP11.2 | 40 | 240/200/200/321/321 | 150/139/148/162/247 | 190/190/190/155/155 | 33.0 ± 0.1 | 2800 |
| | Ethylene feed stream 30/20/25/25/0, reactor length 120/120/585/375/300 (m) and reactor inside diameter 30/38/46/54/54 (mm) for different reaction zones |
| 30/20/25/25/0 | CP12.1 | 40 | 240/240/240/309/309 | 150/160/175/192/240 | 190/190/190/155/155 | 33.0 ± 0.1 | 2800 |
|  | IP12.1 | 40 | 240/220/220/313/313 | 150/160/162/177/243 | 190/190/190/155/155 | 33.0 ± 0.1 | 2800 |
|  | CP12.2 | 40 | 240/200/200/321/321 | 150/160/148/162/247 | 190/190/190/155/155 | 33.0 ± 0.1 | 2800 |

*The ethylene based feed stream to the first reaction zone, based on the total ethylene based feed stream(s) fed to the reactor system.
**The discharge temperature of the Hyper of 70° C. was assumed.
***BW is boiling water temperature. The term "boiling water," as used herein, refers to the temperature of water (or liquid) at which the vapor pressure of water (liquid) equals the pressure of the drum containing water (liquid) and wherein water (liquid) changes from liquid to vapor phase, which is used to subtract the heat generated in the reactor system during polymerization. Typically the pressure of the water drum used in the polymerization of ethylene is around 8 bar to 20 bar, or 10 bar to 18 bar, or 12 bar to 16 bar.

TABLE 3B

Process Configurations and Operating Conditions

| Ethylene feed distribution* EBF1/EBF2/ EBF3/EBF4 | Ex. | Feed temperature** EBF2/EBF3/EBF4/EBF5 [° C.] | Peak temps. [° C.] | Start temps. [° C.] | BW*** [° C.] | Ethylene conversion wt % | Reactor inlet pressure bar |
|---|---|---|---|---|---|---|---|
| | Ethylene feed stream 30/30/40/0/0, reactor length 136/153/595/238/150 (m) and reactor inside diameter 30/42/54/54/54 (mm) for different reaction zones |
| 30/30/40/0/0 | CP4.1 | 40/40/40/40 | 240/240/295/295/295 | 150/139/163/252/260 | 190/190/155/155/155 | 33.0 ± 0.1 | 2800 |
|  | IP4.1 | 40/40/40/40 | 240/220/297/297/297 | 150/139/150/255/261 | 190/190/155/155/155 | 33.0 ± 0.1 | 2800 |
|  | CP4.2 | 40 | 240/200/302/302/302 | 150/139/138/260/264 | 190/190/155/155/155 | 33.0 ± 0.1 | 2800 |
|  | CP5.1 | 40 | 240/240/293/293/293 | 150/138/163/249/258 | 190/190/155/155/155 | 33.0 ± 0.1 | 2800 |
|  | IP5.1 | 40 | 240/220/295/295/295 | 150/138/150/252/259 | 190/190/155/155/155 | 33.0 ± 0.1 | 2800 |
|  | CP5.2 | 40 | 240/200/301/301/301 | 150/138/138/258/263 | 190/190/155/155/155 | 33.0 ± 0.1 | 2800 |
|  | CP6.1 | 40 | 250/250/294/289/289 | 150/141/168/246/256 | 190/190/155/155/155 | 33.0 ± 0.1 | 2800 |
|  | IP6.1 | 40 | 250/220/294/294/294 | 150/140/150/251/259 | 190/190/155/155/155 | 33.0 ± 0.1 | 2800 |
|  | CP6.2 | 40 | 250/200/299/299/299 | 150/140/138/257/261 | 190/190/155/155/155 | 33.0 ± 0.1 | 2800 |
|  | CP6.1.1 | 40 | 240/240/295/295/295 | 150/138/163/248/258 | 190/190/155/155/155 | 33.0 ± 0.1 | 2800 |
|  | IP6.1.1 | 40 | 240/220/299/299/299 | 150/138/150/252/259 | 190/190/155/155/155 | 33.0 ± 0.1 | 2800 |
|  | CP6.1.2 | 40 | 240/200/301/301/301 | 150/138/138/257/263 | 190/190/155/155/155 | 33.0 ± 0.1 | 2800 |
|  | CP7.1 | 40 | 240/240/279/279/279 | 150/137/162/231/238 | 190/190/155/155/155 | 33.0 ± 0.1 | 2800 |
|  | IP7.1 | 40 | 240/220/282/282/282 | 150/137/150/235/239 | 190/190/155/155/155 | 33.0 ± 0.1 | 2800 |
|  | CP7.2 | 40 | 240/200/288/288/288 | 150/137/138/240/241 | 190/190/155/155/155 | 33.0 ± 0.1 | 2800 |
|  | CP8.1 | 40 | 240/240/307/307/307 | 150/139/163/270/279 | 190/190/155/155/155 | 33.0 ± 0.1 | 2800 |
|  | IP8.1 | 40 | 240/220/307/310/310 | 150/139/150/274/281 | 190/190/155/155/155 | 33.0 ± 0.1 | 2800 |
|  | CP8.2 | 40 | 240/200/316/316/316 | 150/138/138/262/265 | 190/190/155/155/155 | 33.0 ± 0.1 | 2800 |
|  | CP9.1 | 40 | 240/240/295/295/295 | 150/138/163/251/260 | 190/190/155/155/155 | 33.0 ± 0.1 | 2800 |

TABLE 3B-continued

Process Configurations and Operating Conditions

| Ethylene feed distribution* EBF1/EBF2/EBF3/EBF4 | Ex. | Feed temperature** EBF2/EBF3/EBF4/EBF5 [° C.] | Peak temps. [° C.] | Start temps. [° C.] | BW*** [° C.] | Ethylene conversion wt % | Reactor inlet pressure bar |
|---|---|---|---|---|---|---|---|
| | | Ethylene feed stream 30/30/40/0/0, reactor length 136/153/595/238/150 (m) and reactor inside diameter 30/42/54/54/54 (mm) for different reaction zones | | | | | |
| | IP9.1 | 40 | 240/220/297/297/297 | 150/138/150/255/261 | 190/190/155/155/155 | 33.0 ± 0.1 | 2800 |
| | CP9.2 | 40 | 240/200/303/303/303 | 150/138/138/262/265 | 190/190/155/155/155 | 33.0 ± 0.1 | 2800 |
| | CP10.1 | 40 | 240/240/298/298/298 | 150/138/163/255/262 | 190/190/155/155/155 | 33.0 ± 0.1 | 2800 |
| | IP10.1 | 40 | 240/220/301/301/301 | 150/138/150/259/265 | 190/190/155/155/155 | 33.0 ± 0.1 | 2800 |
| | CP10.2 | 40 | 240/200/306/306/306 | 150/138/138/265/267 | 190/190/155/155/155 | 33.0 ± 0.1 | 2800 |

*The ethylene based feed stream to the first reaction zone, based on the total ethylene based feed stream(s) fed to the reactor system.
**The discharge temperature of the Hyper of 70° C. was assumed.
***BW is boiling water temperature. The term "boiling water," as used herein, refers to the temperature of water (or liquid) at which the vapor pressure of water (liquid) equals the pressure of the drum containing water (liquid) and wherein water (liquid) changes from liquid to vapor phase, which is used to subtract the heat generated in the reactor system during polymerization. Typically the pressure of the water drum used in the polymerization of ethylene is around 8 bar to 20 bar, or 10 bar to 18 bar, or 12 bar to 16 bar.

TABLE 4A

Chain Transfer Agent and Ethylene Distribution to each Reaction Zone***

| Ethylene feed distribution* | Example | MI dg/min | Cs** [—] | FE1 [—] | FE2 [—] | FE3 [—] | FE4 [—] | RFE2 (FE1/FE2) [—] | RFE3 (FE1/FE3) [—] | RFE4 (FE1/FE4) [—] | Z1/Z2 [—] | Z1/Z3 [—] | Z1/Z4 |
|---|---|---|---|---|---|---|---|---|---|---|---|---|---|
| 33/33/33/0 | CP1.1 | 1 | 0.33 | 0 | 0.1 | 0.8 | NA | 0 | 0 | NA | 2.89 | 1.65 | NA |
| | IP1.1 | 1 | 0.33 | 0 | 0.1 | 0.8 | NA | 0 | 0 | NA | 2.89 | 1.65 | NA |
| | CP1.2 | 1 | 0.33 | 0 | 0.1 | 0.8 | NA | 0 | 0 | NA | 2.89 | 1.65 | NA |
| 25/25/50/0/0 | CP2.1 | 1 | 0.33 | 0 | 0 | 0.7 | NA | Undefined | 0 | NA | 1.14 | 1.61 | NA |
| | IP2.1 | 1 | 0.33 | 0 | 0 | 0.7 | NA | Undefined | 0 | NA | 1.14 | 1.61 | NA |
| 40/40/20/0/0 | CP3.1 | 1 | 0.33 | 0 | 0.4 | 0.8 | NA | 0 | 0 | NA | 1.33 | 1.63 | NA |
| | IP3.1 | 1 | 0.33 | 0 | 0.4 | 0.8 | NA | 0 | 0 | NA | 1.33 | 1.63 | NA |
| | CP3.2 | 1 | 0.33 | 0 | 0.4 | 0.8 | NA | 0 | 0 | NA | 1.33 | 1.63 | NA |
| 25/25/25/25/0 | CP11.1 | 1 | 0.33 | 0 | 0 | 0.5 | 0.8 | Undefined | 0 | 0 | 0 | 0 | 1.12 |
| | IP11.1 | 1 | 0.33 | 0 | 0 | 0.5 | 0.8 | Undefined | 0 | 0 | 0 | 0 | 1.12 |
| | IP11.2 | 1 | 0.33 | 0 | 0 | 0.5 | 0.8 | Undefined | 0 | 0 | 0 | 0 | 1.12 |
| | IP11.3 | 1 | 0.33 | 0 | 0 | 0.5 | 0.8 | Undefined | 0 | 0 | 0 | 0 | 1.12 |
| | IP11.4 | 1 | 0.33 | 0 | 0 | 0.5 | 0.8 | Undefined | 0 | 0 | 0 | 0 | 1.12 |
| | IP11.5 | 1 | 0.33 | 0 | 0 | 0.5 | 0.8 | Undefined | 0 | 0 | 0 | 0 | 1.12 |
| | CP11.2 | 1 | 0.33 | 0 | 0 | 0.5 | 0.8 | Undefined | 0 | 0 | 0 | 0 | 1.12 |
| 30/20/25/25/0 | CP12.1 | 1 | 0.33 | 0 | 0 | 0.5 | 0.8 | Undefined | 0 | 0 | 0 | 0 | 1.08 |
| | IP12.1 | 1 | 0.33 | 0 | 0 | 0.5 | 0.8 | Undefined | 0 | 0 | 0 | 0 | 1.08 |
| | CP12.2 | 1 | 0.33 | 0 | 0 | 0.5 | 0.8 | Undefined | 0 | 0 | 0 | 0 | 1.08 |

B) Z1/Z2 is the ratio of the activity of the CTA system in the first ethylene feed (Z1) to the activity of the CTA system in the second ethylene feed (Z2). C) Z1/Z3 is the ratio of the activity of the CTA system in the first ethylene feed (Z1) to the activity of the CTA system in the third ethylene feed (Z3). The FE1, FE2 and FE3 are the make-up/make-up ethylene distributed over the corresponding reaction zone. REF2 and REF3 are the ratio of make-up ethylene of the corresponding reaction zone over the first reaction zone.
*The ethylene based feed stream to the first reaction zone, based on the total ethylene based feed stream(s) fed to the reactor system.
**See Table A, for example, propionaldehyde.
***For each polymerization, a LDPE was formed.

TABLE 4B

Chain Transfer Agent and Make-up Ethylene Distribution (FEi, I = 1-4) to each Reaction Zone***

| Ethylene feed distribution | Example | MI dg/min | Cs** [—] | FE1 [—] | FE2 [—] | FE3 [—] | FE4 | RFE2 (FE1/FE2) [—] | RFE3 (FE1/FE3) [—] | RFE4 (FE1/FE4) | Z1/Z2 [—] | Z1/Z3 [—] | Z1/Z4 |
|---|---|---|---|---|---|---|---|---|---|---|---|---|---|
| 30/30/40/0/0 | CP4.1 | 1 | 0.33 | 0.3 | 0.3 | 0.3 | NA | 1 | 1 | NA | 1 | 1 | NA |
| | IP4.1 | 1 | 0.33 | 0.3 | 0.3 | 0.3 | NA | 1 | 1 | NA | 1 | 1 | NA |
| | CP4.2 | 1 | 0.33 | 0.3 | 0.3 | 0.3 | NA | 1 | 1 | NA | 1 | 1 | NA |
| | CP5.1 | 1 | 0.33 | 0 | 0.02 | 0.8 | NA | 0 | 0 | NA | 1 | 1.4 | NA |
| | IP5.1 | 1 | 0.33 | 0 | 0.02 | 0.8 | NA | 0 | 0 | NA | 1 | 1.4 | NA |
| | CP5.2 | 1 | 0.33 | 0 | 0.02 | 0.8 | NA | 0 | 0 | NA | 1 | 1.4 | NA |
| | CP6.1 | 1 | 0.33 | 0 | 0.02 | 0.8 | NA | 0 | 0 | NA | 1.21 | 1.78 | NA |
| | IP6.1 | 1 | 0.33 | 0 | 0.02 | 0.8 | NA | 0 | 0 | NA | 1.21 | 1.78 | NA |
| | CP6.2 | 1 | 0.33 | 0 | 0.02 | 0.8 | NA | 0 | 0 | NA | 1.21 | 1.78 | NA |
| | CP6.1.1 | 1 | 0.33 | 0 | 0.02 | 0.8 | NA | 0 | 0 | NA | 1.21 | 1.78 | NA |
| | IP6.1.1 | 1 | 0.33 | 0 | 0.02 | 0.8 | NA | 0 | 0 | NA | 1.21 | 1.78 | NA |

TABLE 4B-continued

Chain Transfer Agent and Make-up Ethylene Distribution (FEi, I = 1-4) to each Reaction Zone***

| Ethylene feed distribution | Example | MI dg/min | Cs** [—] | FE1 [—] | FE2 [—] | FE3 [—] | FE4 | RFE2 (FE1/FE2) [—] | RFE3 (FE1/FE3) [—] | RFE4 (FE1/FE4) | Z1/Z2 [—] | Z1/Z3 [—] | Z1/Z4 |
|---|---|---|---|---|---|---|---|---|---|---|---|---|---|
| | CP6.1.2 | 1 | 0.33 | 0 | 0.02 | 0.8 | NA | 0 | 0 | NA | 1.21 | 1.78 | NA |
| | CP7.1 | 10 | 0.33 | 0 | 0.02 | 0.8 | NA | 0 | 0 | NA | 1.1 | 1.62 | NA |
| | IP7.1 | 10 | 0.33 | 0 | 0.02 | 0.8 | NA | 0 | 0 | NA | 1.1 | 1.62 | NA |
| | CP7.2 | 10 | 0.33 | 0 | 0.02 | 0.8 | NA | 0 | 0 | NA | 1.1 | 1.62 | NA |
| | CP8.1 | 0.2 | 0.33 | 0 | 0.02 | 0.8 | NA | 0 | 0 | NA | 1.1 | 1.62 | NA |
| | IP8.1 | 0.2 | 0.33 | 0 | 0.02 | 0.8 | NA | 0 | 0 | NA | 1.1 | 1.62 | NA |
| | CP8.2 | 0.2 | 0.33 | 0 | 0.02 | 0.8 | NA | 0 | 0 | NA | 1.1 | 1.62 | NA |
| | CP9.1 | 1 | 0.012 | 0 | 0.02 | 0.8 | NA | 0 | 0 | NA | 1.18 | 1.74 | NA |
| | IP9.1 | 1 | 0.012 | 0 | 0.02 | 0.8 | NA | 0 | 0 | NA | 1.18 | 1.74 | NA |
| | CP9.2 | 1 | 0.012 | 0 | 0.02 | 0.8 | NA | 0 | 0 | NA | 1.18 | 1.74 | NA |
| | CP10.1 | 1 | 0.0072 | 0 | 0.02 | 0.8 | NA | 0 | 0 | NA | 1.01 | 1.49 | NA |
| | IP10.1 | 1 | 0.0072 | 0 | 0.02 | 0.8 | NA | 0 | 0 | NA | 1.01 | 1.49 | NA |
| | CP10.2 | 1 | 0.0072 | 0 | 0.02 | 0.8 | NA | 0 | 0 | NA | 1.01 | 1.49 | NA |

*The ethylene based feed stream to the first reaction zone, based on the total ethylene based feed stream(s) fed to the reactor system.
**See Table A: propionaldehyde (Cs = 0.33), propylene (Cs 0.0122), isobutene (Cs 0.0072).
***For each polymerization, a LDPE was formed; except for CP9.1, IP9.1 and CP9.2, where a minor amount propylene incorporates as a comonomer.

TABLE 5A

Simulated Polymer Properties

| Ethylene feed distribution* | Example | SCBf 1/1000 C | LCBf 1/1000 C | Mw/Mn — | Normalized MWD | % | MWD normalized vs. CP1.1 % | EBF2/ EBF1 | EBF3/ EBF1 | Δ(TP1 − TP2) °C. | Δ(TP1 − TP3) °C. |
|---|---|---|---|---|---|---|---|---|---|---|---|
| 33/33/33/0 | CP1.1 | 21.59 | 2.88 | 5.04 | CP1.1/CP1.1 | 100.0% | 100 | 1 | 1 | 0 | NA |
| | IP1.1 | 21.71 | 2.94 | 4.98 | IP1.1/CP1.1 | 98.9% | | 1 | 1 | 20 | NA |
| | CP1.2 | 21.83 | 3.00 | 4.99 | CP1.2/CP1.1 | 99.0% | | 1 | 1 | 40 | NA |
| 25/25/50/0/0 | CP2.1 | 22.39 | 3.37 | 5.97 | CP2.1/CP2.1 | 100.0% | 119 | 1 | 2 | 0 | NA |
| | IP2.1 | 22.43 | 3.42 | 5.87 | IP2.1/CP2.1 | 98.2% | | 1 | 2 | 13 | NA |
| 40/40/20/0/0 | CP3.1 | 22.88 | 3.41 | 6.04 | CP3.1/CP3.1 | 100.0% | 120 | 1 | 0.5 | 0 | NA |
| | IP3.1 | 22.83 | 3.43 | 5.89 | IP3.1/CP3.1 | 97.4% | | 1 | 0.5 | 20 | NA |
| | CP3.2 | 23.05 | 3.50 | 6.01 | CP3.2/CP3.1 | 99.5% | | 1 | 0.5 | 40 | NA |
| 25/25/25/25/0 | CP11.1 | 23.05 | 3.56 | 6.46 | CP11.1/CP11.1 | 100.0% | 128 | 1 | 1 | 0 | 0 |
| | IP11.1 | 22.99 | 3.6 | 6.08 | IP11.1/CP11.1 | 94.1% | | 1 | 1 | 20 | 20 |
| | IP11.2 | 23 | 3.57 | 6.21 | IP11.2/CP11.1 | 96.1% | | 1 | 1 | 20 | 0 |
| | IP11.3 | 23.03 | 3.59 | 6.31 | IP11.3/CP11.1 | 97.7% | | 1 | 1 | 0 | 20 |
| | IP11.4 | 22.82 | 3.57 | 5.95 | IP11.4/CP11.1 | 92.0% | | 1 | 1 | 20 | 20 |
| | IP11.5 | 23.71 | 3.79 | 6.8 | IP11.5/CP11.1 | 105.3% | | 1 | 1 | 20 | 20 |
| | CP11.2 | 23.48 | 3.8 | 6.34 | CP11.2/CP11.1 | 98.1% | | 1 | 1 | 40 | 40 |
| 30/20/25/25/0 | CP12.1 | 23.07 | 3.55 | 8.20 | CP12.1/CP12.1 | 100.0% | 163 | 1 | 1 | 0 | 0 |
| | IP12.1 | 23.00 | 3.58 | 7.69 | IP12.1/CP12.1 | 93.8% | | 1 | 1 | 20 | 20 |
| | CP12.2 | 23.48 | 3.78 | 7.99 | CP12.2/CP12.1 | 97.5% | | 1 | 1 | 40 | 40 |

*The ethylene based feed stream to the first reaction zone, based on the total ethylene based feed stream(s) fed to the reactor system.
NA = Not Applicable.

TABLE 5B

Simulated polymer properties

| Ethylene feed distribution* | Example | SCBf 1/1000 C | LCBf 1/1000 C | Mw/Mn — | Normalized MWD | % | Normalized MWD (vs. CP1.1) % | EBF2/ EBF1 — | EBF3/ EBF1 — | Δ(TP1 − TP2) °C. | Δ(TP1 − TP3) °C. |
|---|---|---|---|---|---|---|---|---|---|---|---|
| 30/30/40/0/0 | CP4.1 | 22.62 | 3.41 | 8.63 | CP4.1/CP4.1 | 100.0% | 171 | 1 | 1.33 | 0 | NA |
| | IP4.1 | 22.54 | 3.42 | 8.18 | IP4.1/CP4.1 | 94.8% | | 1 | 1.33 | 20 | NA |
| | CP4.2 | 22.92 | 3.56 | 8.3 | CP4.2/CP4.1 | 96.2% | | 1 | 1.33 | 40 | NA |
| | CP5.1 | 22.43 | 3.33 | 6.34 | CP5.1/CP5.1 | 100.0% | 126 | 1 | 1.33 | 0 | NA |
| | IP5.1 | 22.36 | 3.35 | 6.07 | IP5.1/CP5.1 | 95.8% | | 1 | 1.33 | 20 | NA |
| | CP5.2 | 22.83 | 3.52 | 6.38 | CP5.2/CP5.1 | 100.5% | | 1 | 1.33 | 40 | NA |
| | CP6.1 | 22.28 | 3.26 | 5.92 | CP6.1/CP6.1 | 100.0% | 118 | 1 | 1.33 | 0 | NA |

TABLE 5B-continued

Simulated polymer properties

| Ethylene feed distribution* | Example | SCBf 1/1000 C | LCBf 1/1000 C | Mw/Mn — | Normalized MWD | % | Normalized MWD (vs. CP1.1) % | EBF2/ EBF1 — | EBF3/ EBF1 — | Δ(TP1 − TP2) °C. | Δ(TP1 − TP3) °C. |
|---|---|---|---|---|---|---|---|---|---|---|---|
| | IP6.1 | 22.31 | 3.33 | 5.42 | IP6.1/CP6.1 | 85.5% | | 1 | 1.33 | 30 | NA |
| | CP6.2 | 22.69 | 3.46 | 5.64 | CP6.2/CP6.1 | 95.2% | | 1 | 1.33 | 50 | NA |
| | CP6.1.1 | 22.44 | 3.34 | 7.24 | CP6.1.1/CP6.1.1 | 100.0% | 144% | 1 | 1.33 | 0 | NA |
| | IP6.1.1 | 22.36 | 3.35 | 6.58 | IP6.1.1/CP6.1.1 | 90.9% | | 1 | 1.33 | 20 | NA |
| | CP6.1.2 | 22.82 | 3.52 | 6.91 | CP6.1.2/CP6.1.1 | 95.4% | | 1 | 1.33 | 40 | NA |
| | CP7.1 | 21.52 | 2.94 | 3.9 | CP7.1/CP7.1 | 100.0% | 77 | 1 | 1.33 | 0 | NA |
| | IP7.1 | 21.54 | 2.99 | 3.84 | IP7.1/CP7.1 | 98.4% | | 1 | 1.33 | 20 | NA |
| | CP7.2 | 21.95 | 3.12 | 4.01 | CP7.2/CP7.1 | 102.8% | | 1 | 1.33 | 40 | NA |
| | CP8.1 | 23.38 | 3.77 | 8.94 | CP8.1/CP8.1 | 100.0% | 177 | 1 | 1.33 | 0 | NA |
| | IP8.1 | 23.39 | 3.83 | 8.67 | IP8.1/CP8.1 | 97.0% | | 1 | 1.33 | 20 | NA |
| | CP8.2 | 23.84 | 4.01 | 9.31 | CP8.2/CP8.1 | 104.1% | | 1 | 1.33 | 40 | NA |
| | CP9.1 | 26.57 | 3.49 | 8.12 | CP9.1/CP9.1 | 100.0% | 161 | 1 | 1.33 | 0 | NA |
| | IP9.1 | 26.5 | 3.5 | 7.85 | IP9.1/CP9.1 | 96.7% | | 1 | 1.33 | 20 | NA |
| | CP9.2 | 26.63 | 3.66 | 8.5 | CP9.2/CP9.1 | 104.6% | | 1 | 1.33 | 40 | NA |
| | CP10.1 | 24.07 | 3.68 | 11.42 | CP10.1/CP10.1 | 100.0% | 227 | 1 | 1.33 | 0 | NA |
| | IP10.1 | 24.07 | 3.74 | 11.19 | IP10.1/CP10.1 | 98.0% | | 1 | 1.33 | 20 | NA |
| | CP10.2 | 24.35 | 3.87 | 11.86 | CP10.2/CP10.1 | 103.9% | | 1 | 1.33 | 40 | NA |

*The ethylene based feed stream to the first reaction zone, based on the total ethylene based feed stream(s) fed to the reactor system.

The invention claimed is:

1. A process to form an ethylene-based polymer, in the presence of at least one free-radical, said process comprises at least the following:

polymerizing a mixture comprising ethylene, in a tubular reactor system comprising at least three ethylene-based feeds, and a reactor configuration comprising at least four reaction zones, and wherein the weight ratio of "the ethylene-based feed to the second reaction zone (EBF2)" to "the ethylene-based feed to the first reaction zone (EBF1)," EBF2/EBF1, is from 0.50 to 1.10; and wherein the weight ratio of "the ethylene-based feed to the third reaction zone (EBF3)" to "the ethylene-based feed to the first reaction zone (EBF1)," EBF3/EBF1, is from 0.40 to 2.50; and wherein in each reaction zone, the polymerization takes place at a start temperature greater, or equal to, 135° C.; and wherein at least one of the following is met:

(a) for three or more ethylene based feed streams, the peak polymerization temperatures in the first and the second reaction zones, are each, independently, from 200° C. to 250° C.; or (b) for four or more ethylene based feed streams, the peak polymerization temperatures in the first, the second and the third reaction zones, are each, independently, from 200° C. to 250° C.;

and wherein the temperature differential between the peak temperatures of the first three reaction zones meets at least one the following relationships:

i) TP1>TP2, and 10° C.≤Δ(TP1−TP2)≤30° C.; and/or
ii) TP1>TP3, and 10° C.≤Δ(TP1−TP3)≤30° C.; and/or
iii) TP1≥TP2, and TP1>TP3, and 0° C.≤Δ(TP1−TP2)≤30° C., and 10° C.≤Δ(TP1−TP3)≤30° C.; and/or
iv) TP1>TP2, and TP1≥TP3, and 10° C.≤Δ(TP1−TP2)≤30° C., and 0° C.≤Δ(TP1−TP3)≤30° C.; and wherein TP1 is the peak temperature of the first reaction zone (TP1), TP2 is the peak temperature of the second reaction zone, and TP3 is the peak temperature of the third reaction zone, and wherein the ethylene based feed stream to the first reaction zone is from 20 wt % to 50 wt % of the total ethylene based feed stream(s) fed to the reactor system.

2. The process of claim 1, wherein the reactor configuration comprises at least one tubular reactor.

3. The process of claim 1, wherein the tubular reactor system comprises four ethylene-based feed streams and a hyper compressor, and wherein the average feed temperature of the sum of the second, third and/or fourth ethylene-based feed streams is less than the average discharge temperature of the hyper compressor, determined by taking the average temperature of the sum of the discharge streams from the hyper compressor.

4. The process of claim 1, wherein the combined amount of ethylene-based feed fed to the first and second reaction zones is from 20 wt % to 52 wt %, based on the total amount of ethylene-based feeds fed to the polymerization.

5. The process of claim 1, wherein the ethylene conversion is greater than, or equal to, 26%.

6. The process of claim 1, wherein reactor system comprises at least three an ethylene-based feeds, and wherein one feed is fed to a first reaction zone (where i=1), and the other feeds are each fed to a different subsequent reaction zone, selected from the following: at least two of zone i, or zone j, or zone k, where i>1, j>i, k>j, and wherein at least one of the following ratios are met:

a) for three ethylene-based feeds, FE1, FEi, FEj, each represent the ratio of the respective weight fraction of make-up ethylene in the ethylene-based feed to the respective reaction zone (1, i or j), based on the total weight of the ethylene-based feed to this reaction zone; and wherein the ratios RFEj≥RFEi≥RFE1 are met, wherein RFEj=FEj/FE1, RFEi=FEi/FE1 and RFE1=FE1/FE1;

b) for four or more ethylene-based feeds, FE1, FEi, FEj, FEk, each represent the ratio of the respective weight fraction of make-up ethylene in the ethylene-based feed to the respective reaction zone (1, i. j or k), based on the total weight of the ethylene-based feed to this reaction zone; and wherein the ratios RFEk≥RFEj≥RFEi≥RFE1 are met, wherein RFEk=FE1/FEk, RFEj=FE1/FEj, RFEi=FE1/FEj and RFE1=FE1/FE1; and wherein the "total amount of ethylene fed to the polymerization process" derives from at least one make-up ethylene stream and at least one recycled ethylene stream.

7. The process of claim 1, wherein the mixture further comprises at least one CTA selected from an aldehyde, an alkane, a ketone, an alcohol, an ester, an alpha-olefin, or a combination thereof.

8. The process of claim 1, wherein the inlet pressure of the tubular reactor system is less than, or equal to, 3000 Bar.

9. The process of claim 1, wherein ethylene-based polymer has a melt index (I2) from 0.10 to 20.0 g/10 min.

10. The process of claim 1, wherein the ethylene-based polymer is a LDPE.

11. The process of claim 2, wherein the tubular reactor system comprises four ethylene-based feed streams and a hyper compressor, and wherein the average feed temperature of the sum of the second, third and/or fourth ethylene-based feed streams is less than the average discharge temperature of the hyper compressor, determined by taking the average temperature of the sum of the discharge streams from the hyper compressor.

* * * * *